Nov. 30, 1965        L. F. HAGERMAN        3,220,344
TURRET TYPE BOTTLE STENCILING DEVICE
Filed Oct. 27, 1961        11 Sheets-Sheet 4
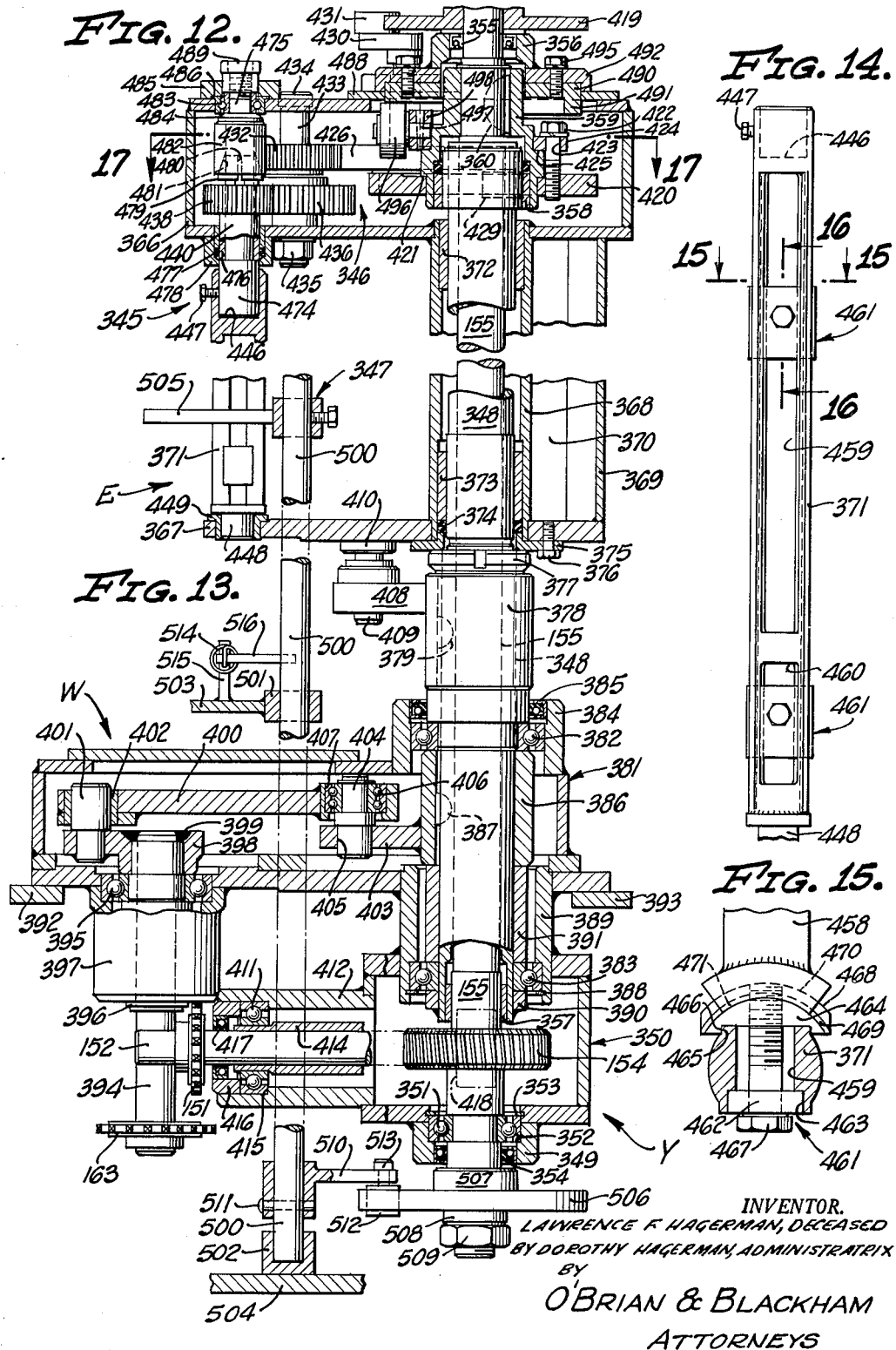
INVENTOR.
LAWRENCE F. HAGERMAN, DECEASED
BY DOROTHY HAGERMAN, ADMINISTRATRIX
BY
O'BRIAN & BLACKHAM
ATTORNEYS Nov. 30, 1965     L. F. HAGERMAN     3,220,344
TURRET TYPE BOTTLE STENCILING DEVICE
Filed Oct. 27, 1961     11 Sheets-Sheet 5
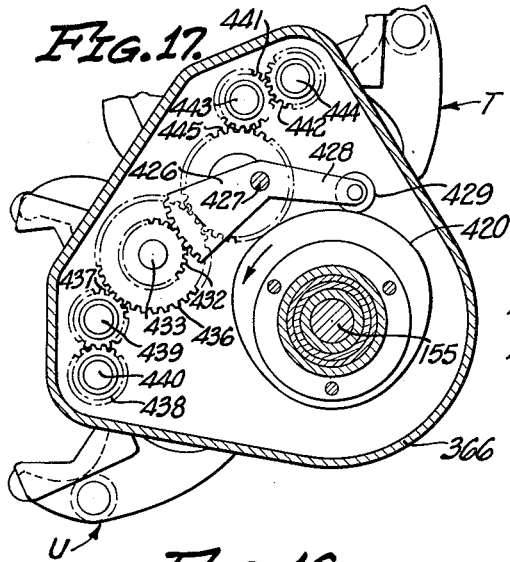
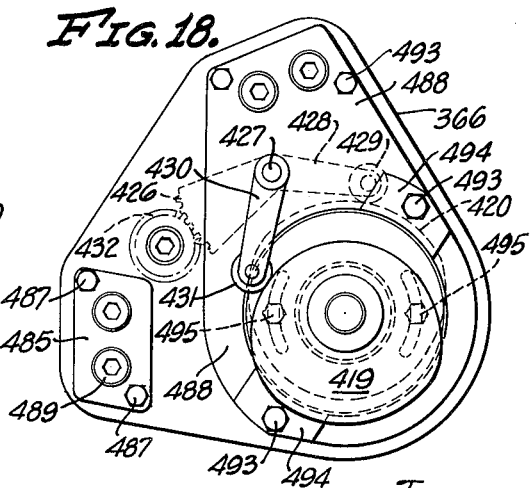
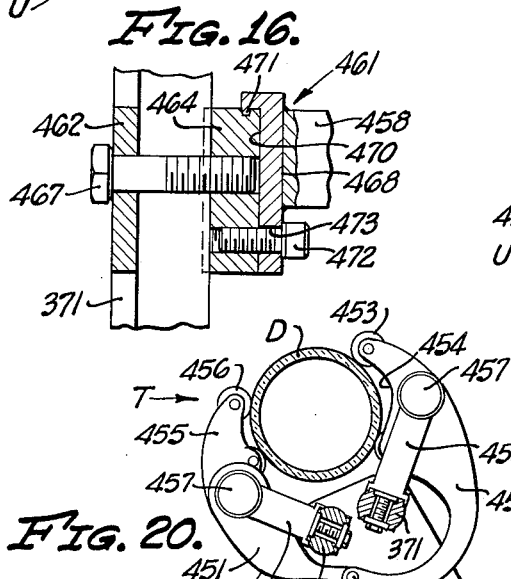
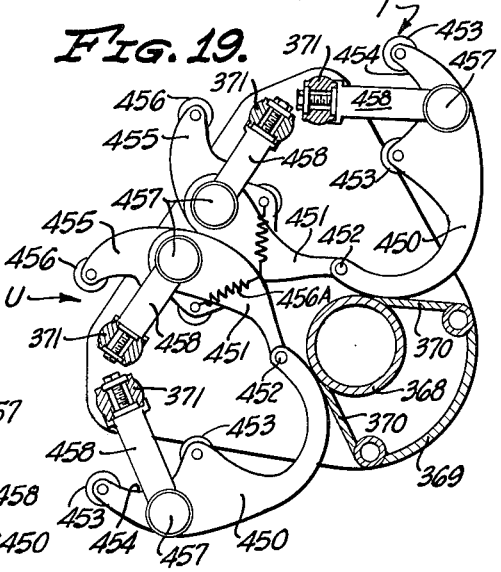
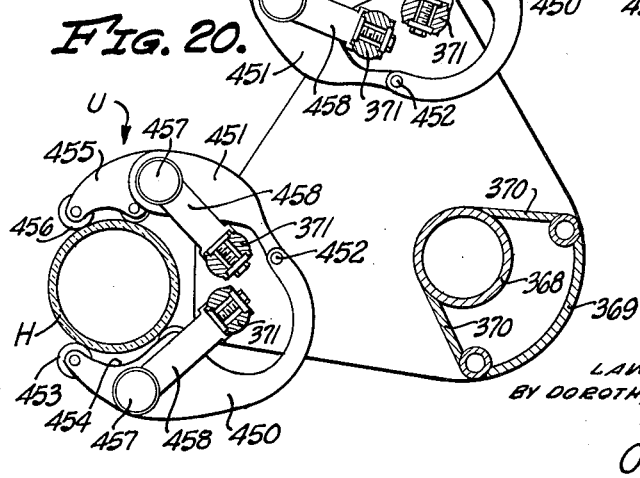
INVENTOR.
LAWRENCE F. HAGERMAN, DECEASED
BY DOROTHY HAGERMAN, ADMINISTRATRIX
BY
O'BRIAN & BLACKHAM
ATTORNEYS

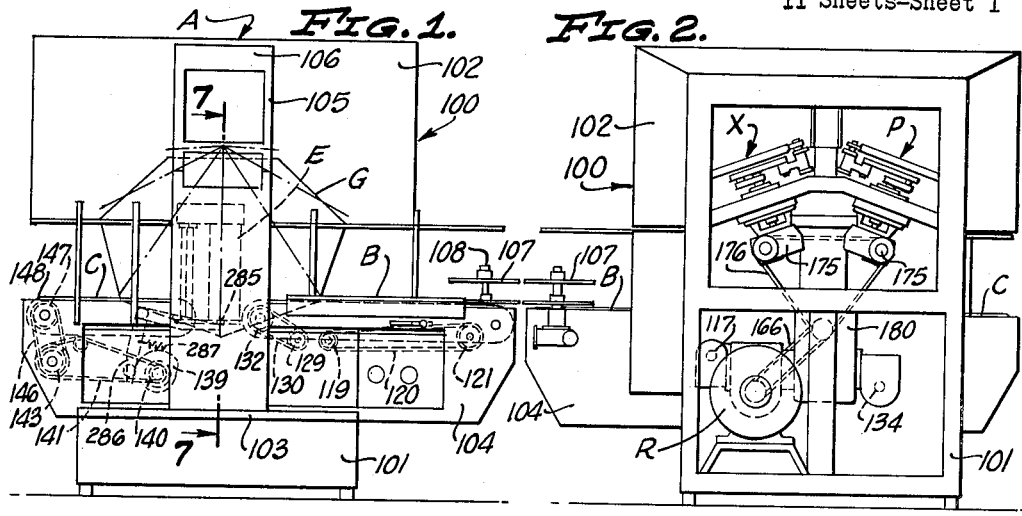

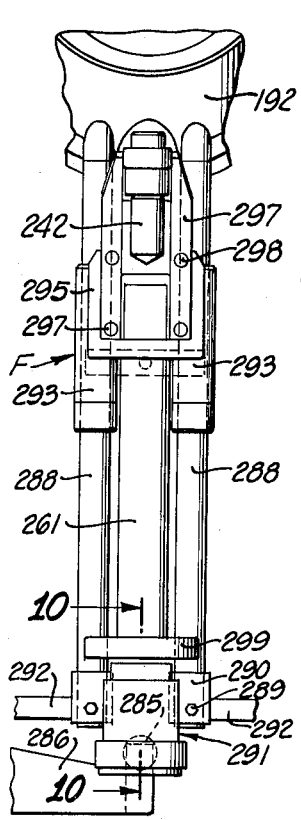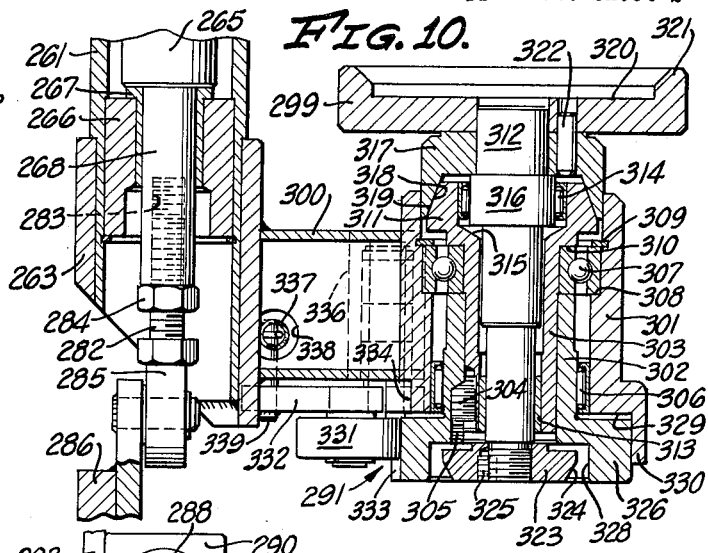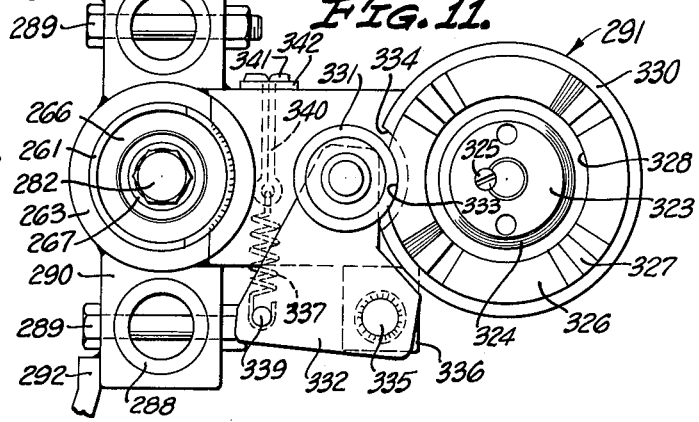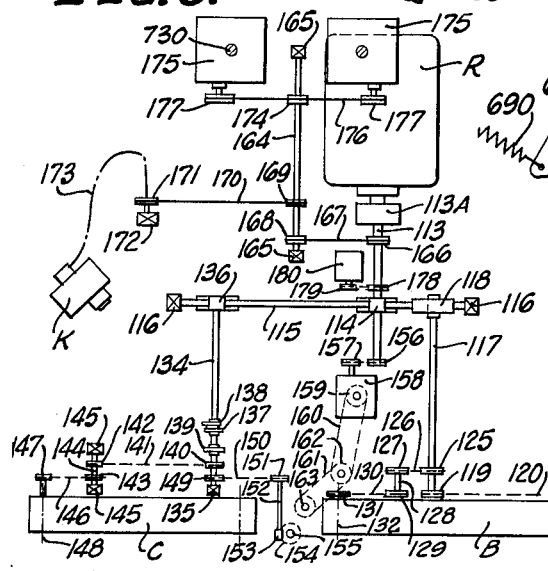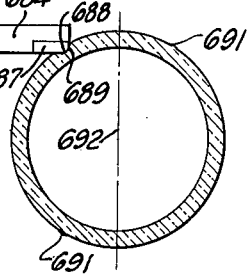

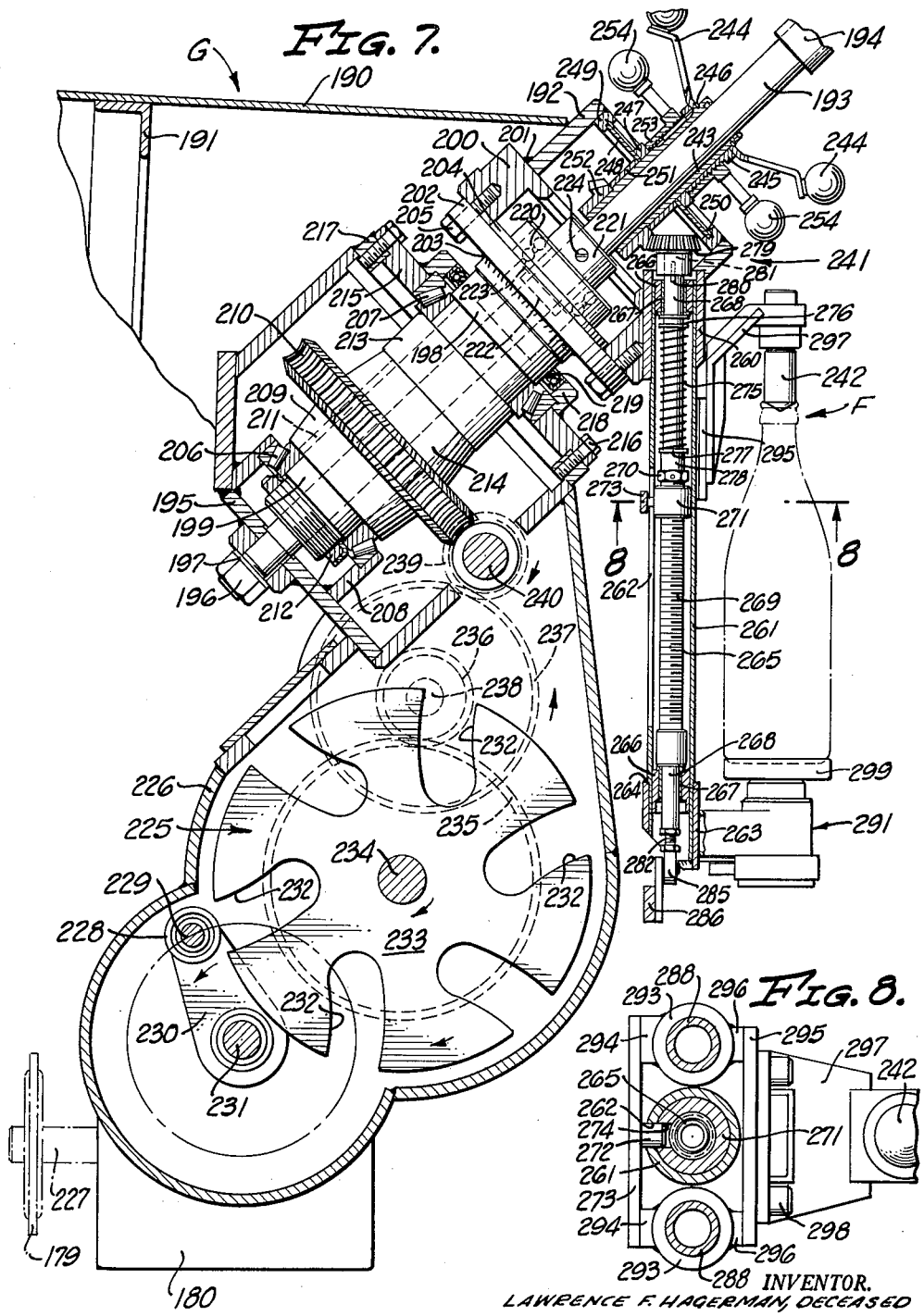

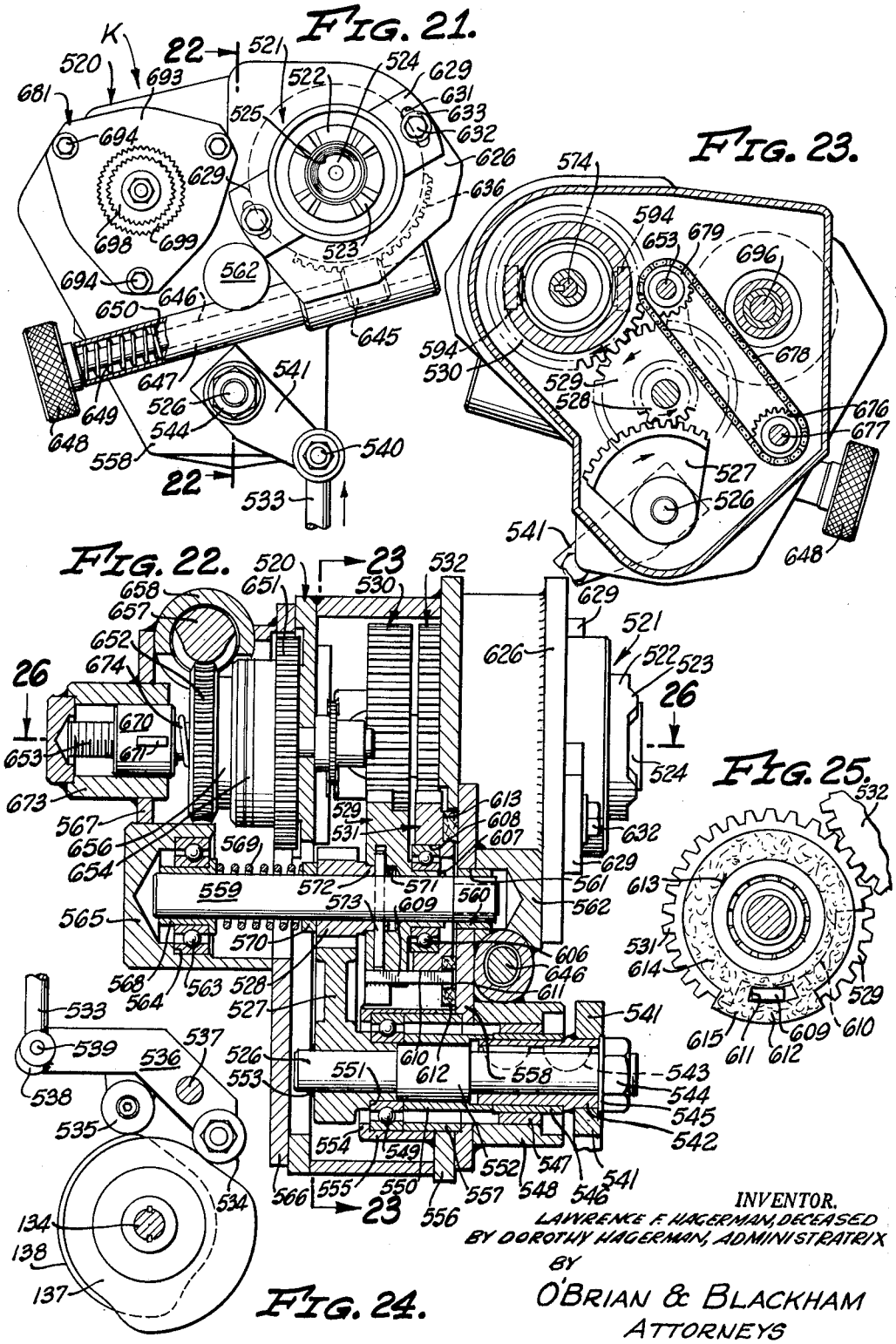

Nov. 30, 1965  L. F. HAGERMAN  3,220,344
TURRET TYPE BOTTLE STENCILING DEVICE
Filed Oct. 27, 1961  11 Sheets-Sheet 7
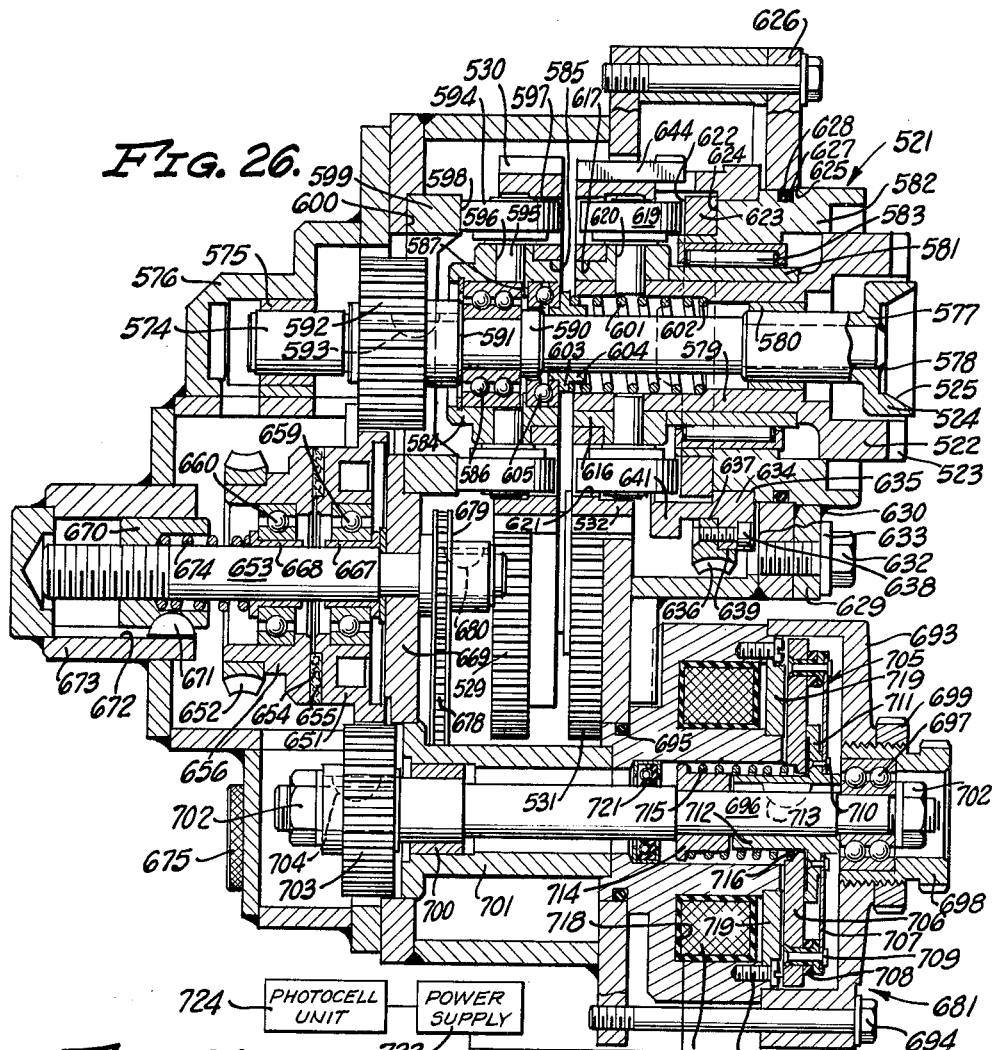
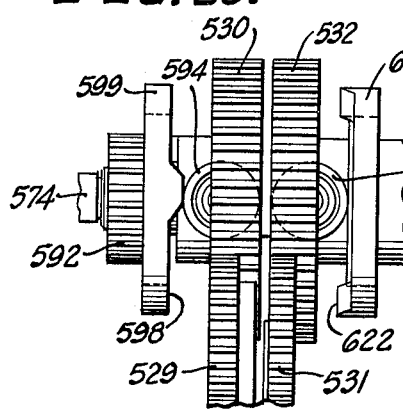
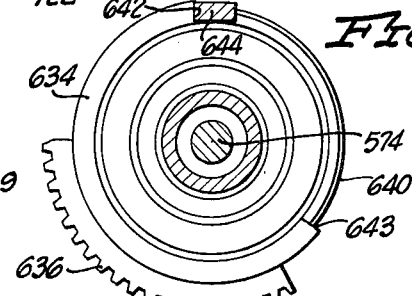
INVENTOR.
LAWRENCE F. HAGERMAN, DECEASED
BY DOROTHY HAGERMAN, ADMINISTRATRIX
BY
O'BRIAN & BLACKHAM
ATTORNEYS Nov. 30, 1965     L. F. HAGERMAN     3,220,344
TURRET TYPE BOTTLE STENCILING DEVICE
Filed Oct. 27, 1961     11 Sheets-Sheet 8

INVENTOR.
LAWRENCE F. HAGERMAN, DECEASED
BY DOROTHY HAGERMAN, ADMINISTRATRIX
BY
O'BRIAN & BLACKHAM
ATTORNEYS

Nov. 30, 1965　　　　　L. F. HAGERMAN　　　　　3,220,344
TURRET TYPE BOTTLE STENCILING DEVICE
Filed Oct. 27, 1961　　　　　　　　　　　　　　11 Sheets-Sheet 9

INVENTOR.
LAWRENCE F. HAGERMAN, DECEASED
BY DOROTHY HAGERMAN, ADMINISTRATRIX
BY
O'BRIAN & BLACKHAM
ATTORNEYS

Nov. 30, 1965 L. F. HAGERMAN 3,220,344
TURRET TYPE BOTTLE STENCILING DEVICE
Filed Oct. 27, 1961 11 Sheets-Sheet 10

INVENTOR.
LAWRENCE F. HAGERMAN, DECEASED
BY DOROTHY HAGERMAN, ADMINISTRATRIX
BY
O'BRIAN & BLACKHAM
ATTORNEYS

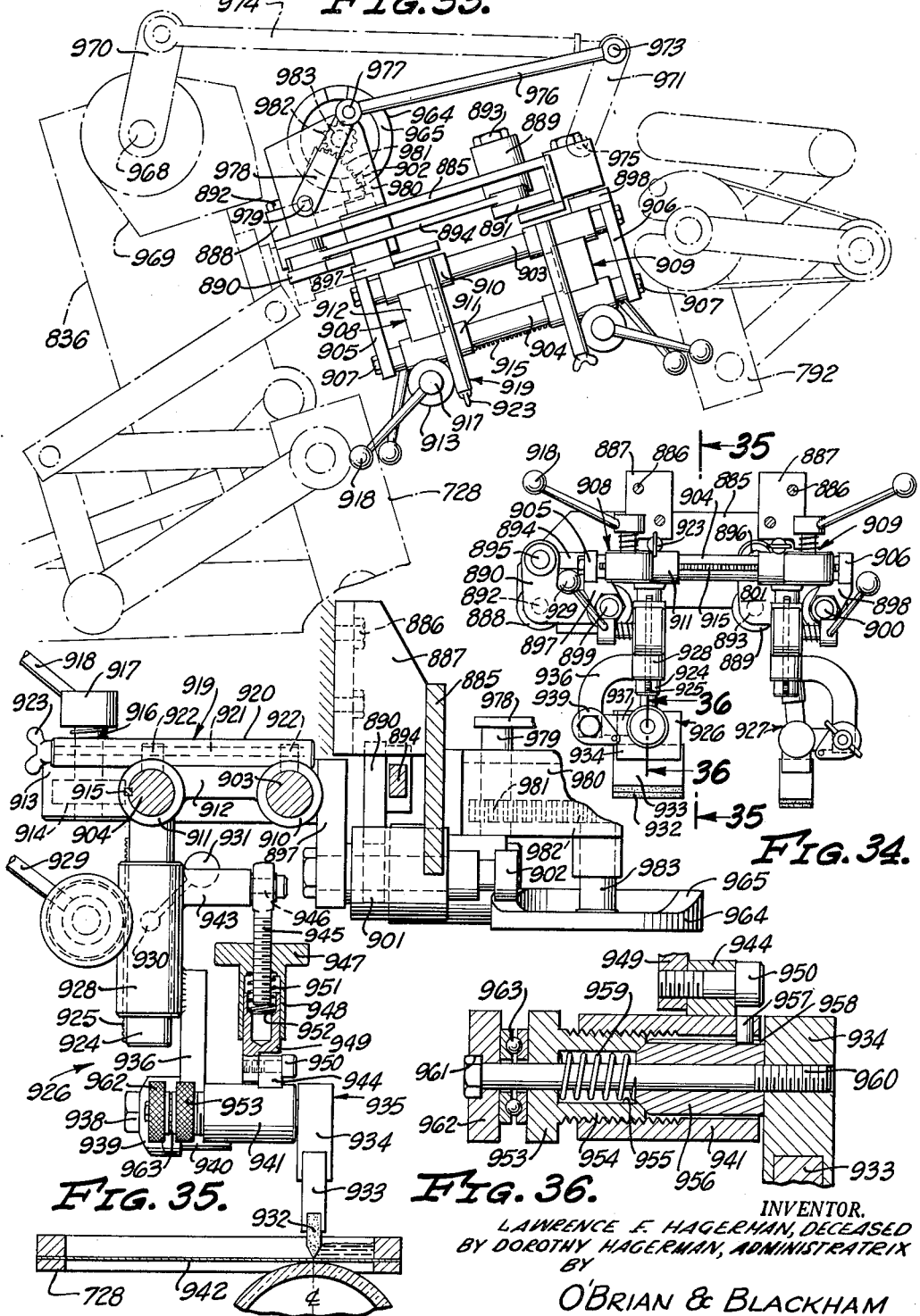

United States Patent Office 3,220,344
Patented Nov. 30, 1965

3,220,344
TURRET TYPE BOTTLE STENCILING DEVICE
Lawrence F. Hagerman, deceased, late of Santa Fe Springs, Calif., by Dorothy Hagerman, administratrix, 12019 Shoemaker, Santa Fe Springs, Calif.
Filed Oct. 27, 1961, Ser. No. 148,285
10 Claims. (Cl. 101—124)

This invention relates to an apparatus for applying decorative or identification markings upon the surfaces of containers.

More particularly, the invention relates to an apparatus for printing multiple colored markings on containers such as bottles, jars, cans or cartons of cylindrical form, wherein the apparatus features components for carrying such containers onto and off a stepping turret capable of positioning a succession of containers in different operational stations as the turret revolves; a register unit for orienting the containers in desired reference positions on the turret; a linkage arrangement for operating printing devices with respect to various printing stations of the turret, and mechanisms for cooperatively moving the containers in the printing stations with respect to the printing devices.

A broad object of the present invention is the provision of a decorating apparatus capable of accurately decorating containers at a high rate of speed. Another object of the present invention is to provide a decorating apparatus for decorating containers at a high rate of speed and which features dependability of operation, economy of manufacture and its adaptability for use with a varied assortment of containers.

Still another object of the invention is the provision of a decorating apparatus capable of applying multicolor decorations on containers at a high speed with accurate registration of decorations of different color. A more specific object is to provide a marking apparatus featuring novel high-speed components for transferring containers on to and off the apparatus, for accurately holding and positioning the containers relative to different operational stations, to accurately register the containers in an indexed position, and for accurately applying the markings on the containers.

The manner in which the advantages of the present invention are realized and its further objects achieved will become more clearly apparent from the subsequent detailed description of the invention considered in reference to the drawings wherein:

FIG. 1 is a front elevational view of a preferred embodiment of the decorating apparatus of the present invention;

FIG. 2 is a rear elevational view of the device in FIG. 1;

FIG. 3 is an elevational view taken from the left side of the apparatus in FIG. 1;

FIG. 4 is an elevational view taken from the right side of the apparatus in FIG. 1;

FIG. 5 is a top plan view of the device in FIG. 1;

FIG. 6 is a diagrammatical view of the power distribution system for imparting driving power to the various components of the apparatus in FIG. 1;

FIG. 7 is a partial, cross-sectional, fragmentary view taken along line 7—7 of FIG. 1 showing the construction of the stepping turret;

FIG. 8 is a cross-sectional view taken along line 8—8 of FIG. 7;

FIG. 9 is a front elevational view of a bottle holding assembly of the turret;

FIG. 10 is a cross-sectional view of the bottle base chuck assembly of the device of FIG. 9 taken along line 10—10;

FIG. 11 is a bottom view of the bottle base chuck of the device in FIG. 9;

FIG. 12 is a cross-sectional view showing the drive unit for actuating the bottle gripping fingers of the bottle transfer unit for transporting bottles from the conveyors to the turret, and vice versa;

FIG. 13 is a cross-sectional view in alignment with FIG. 12 of the bottle transfer unit showing the drive unit for oscillating the transfer unit between the conveyors and the turret;

FIG. 14 is a rear elevational view of a support for the adjustable bottle gripping fingers of the device in FIGS. 12 and 13;

FIG. 15 is a cross-sectional view taken along line 15—15 in FIG. 14;

FIG. 16 is a cross-sectional view taken along line 16—16 of FIG. 14;

FIG. 17 is a cross-sectional view of the bottle gripping fingers drive unit taken along the line 17—17 of FIG. 12;

FIG. 18 is a top view of the drive unit in FIG. 12;

FIG. 19 is a view showing the open position of the bottle gripping fingers of the bottle transfer unit in FIGS. 12 and 13;

FIG. 20 is a view showing the closed position of the bottle gripping fingers of the assembly in FIGS. 12 and 13;

FIG. 21 is a front view of the bottle register unit for positioning the bottle in a reference position prior to decorating operations;

FIG. 22 is a cross-sectional view of the bottle register assembly taken along line 22—22 in FIG. 21;

FIG. 23 is a cross-sectional view of the bottle register assembly taken along line 23—23 in FIG. 22;

FIG. 24 is a partial view showing the cam driving arrangement for the bottle register assembly shown in FIG. 21;

FIG. 25 is a fragmentary view showing the interrelation of driving gears for the bottle rotating clutch mechanism of the bottle register assembly in FIG. 22;

FIG. 26 is a cross-sectional view of the bottle register assembly taken along line 26—26 in FIG. 22;

FIG. 27 is a fragmentary view showing an adjustment of parts of the bottle register assembly in FIG. 22;

FIG. 28 is a fragmentary view showing the relation of cam follower gears and cams for operation of the bottle driving clutch and bottle chuck mechanisms of the bottle register assembly of FIG. 22;

FIG. 33 is a top view of the assembly for controlling the position and movement of the printing squeegees of the apparatus in FIG. 1;

FIG. 34 is a front elevational view of the squeegee adjusting mechanism shown in FIG. 33;

FIG. 35 is a cross-sectional view taken along line 35—35 in FIG. 34;

FIG. 36 is a cross-sectional view taken along line 36—36 in FIG. 34; and

FIG. 37 is a view showing an apparatus for sensing indexing formations on a bottle.

Figure 29:
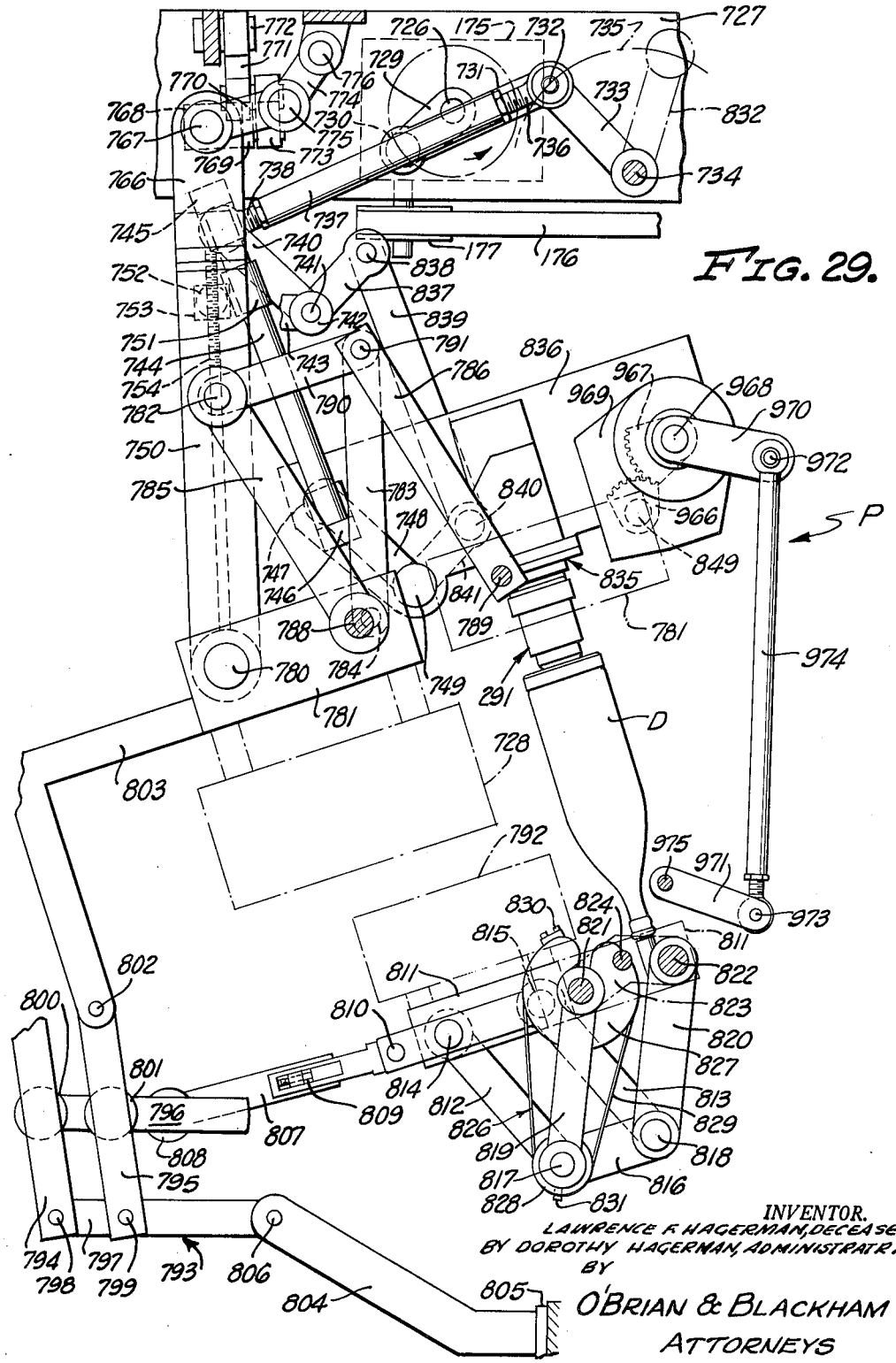
FIG. 29 is a top view showing the driving linkages for operating the components comprising the printing stations of the apparatus in FIG. 1.

In the accompanying drawings my invention is shown in an embodiment wherein it is adapted for use in applying decorations on bottles, such as used for soft drinks. Those skilled in the art to which the invention pertains will realize however, that through the exercise of normal, routine engineering skill apparatus embodying the essential features or principles of this invention may be designed to accommodate other types of containers, such as, jars, glasses, cans or cartons.

To assist in an understanding of the decorating apparatus of the present invention a brief general description of its organization and operation will be set forth. The principal components forming the apparatus will then be described in detail followed by a description of the manner in which the various parts of the apparatus cooperatively interact to achieve the various objects of the invention.

GENERAL DESCRIPTION

The general organization of the apparatus is best depicted in FIGS. 1–6 where its various components are shown in skeleton form, and some omitted entirely from certain figures, both for simplicity of illustration and to show more clearly the general arrangement of the various components comprising the apparatus. As seen in FIG. 1 the decorating apparatus generally designated 100, comprises a housing A having a base 101 and upper cowling 102 provided both externally and internally with suitable frame members to rigidly support, in proper orientation, the various components of the apparatus, in a manner to be described. As shown in FIGS. 3 and 4, the apparatus is provided with an inspection and access catwalk 103 supported on an overhanging section 104 on the base, and frame members 105 and 106.

Briefly described, the principal components of the apparatus and their modes of operation include a loading conveyor B and an unloading conveyor C, each in the form of continuously driven endless conveyors, mounted in aligned relationship on top of the overhanging section 104 of the housing base 101 as may be seen in FIGS. 1 and 5. A uniformly spaced, continuous supply of undecorated bottles D is fed to the loading conveyor B by a rotating pair of spaced star wheels 107, mounted on a shaft 108 at the right side of overhanging section 104, from a rotating turn table 109 adjacent the apparatus. As the star wheels 107 turn clockwise the recesses 110 thereof regularly guide the undecorated bottles past gate 111 where they are presented by the rotary movement of turn table 109 as it aligns the bottles in a moving row against the guide fence 112.

Upon transport of the bottles D to point X on the conveyor B, an oscillating transfer unit E, located between conveyors B and C, successively removes the bottles from conveyor B arriving at point X and deposits them in successive regularly spaced bottle holding clamps F on a revolving stepping turret assembly G as each clamp F is stepped into a first work station of the turret G in front of the transfer unit E. After the apparatus has been in operation long enough to load all the bottle clamps F, the transfer unit E also functions to remove decorated bottles H from the clamps returned by the turret to the first work station and deposits them on the unloading conveyor C while simultaneously reloading the bottle clamp in the first work position with an undecorated bottle D.

The stepping turret G, in the illustrated embodiment of the invention comprises a hollow pyramidal hood formed by seven identical triangular side members. The turret is rotated in step-by-step fashion at a constant rate through seven positions during a complete revolution. As may be seen in FIGS. 3 and 4, the axis of rotation of the turret is canted forwardly at an angle of approximately 45°. A bottle holding clamp F is positioned at each of the seven junctions of the side members. Hence, each bottle placed on the turret is successively stepped into seven different work stations as the turret makes a complete revolution. When the bottles return to the first work station they are removed from the turret by the bottle transfer unit E which simultaneously deposits an undecorated bottle D in its place in the holding clamp F as previously described. The bottles merely idle at the second, sixth and seventh work stations to permit proper coordination of the sequence of operations performed by the apparatus.

When a bottle arrives at the third work station a register unit K functions to precisely position the bottle with its molding seams in a reference position in its holding clamp F. The turret then steps the bottle to the fourth station which corresponds to a first printing station. At this position the bottle is simultaneously revolved in its holding clamp F by a printing drive spindle L while printing frames M and N are moved in rolling contact with the rotating bottle to decorate the bottle with ink or paint decorations of a first color or texture. The printing frames M and N are moved in a straight line path over the bottles by pantograph linkages P and Q, respectively, whose movements are coordinated with the rotational movement of the bottle by the printing drive spindle L. The turret then steps the partially decorated bottle to the fifth position, corresponding to a second printing station, where apparatus similar to that of the fourth work position prints a second decoration on the bottle of different color or texture than that applied at the first printing station. The turret then steps the completely decorated bottle through the sixth and seventh positions and returns it to the initial work station where it is removed from the turret and replaced by another bottle by the transfer unit in the manner previously described.

Power transmission system

The various components of the apparatus described above are driven from a single motor R mounted in the housing A as shown in FIGS. 2 and 4.

FIG. 6 shows the arrangement whereby driving power from the output shaft 113 of the motor R is transmitted to the various components of the apparatus. As shown, shaft 113 comprises a protective overload clutch 113A which permits the motor to turn without driving any of the components in the event the operation of any of the components is jammed by pieces of a broken bottle, for example. This will prevent damage to all components in such an event. The output shaft 113 is coupled by a worm gear assembly 114 to a main transmission shaft 115, supported in bearings 116, to provide driving power thereto. The main shaft 115 is utilized to drive a secondary shaft 117 by means of worm gear assembly 118, which is provided with an end sprocket 119 connected by a roller chain 120 to a sprocket 121 for rotating the star wheels 107 disposed on the shaft 108. Sprocket 121 provides driving power to the shaft 108 of the star wheels by means of a worm gear 122 mounted on the shaft 123 supporting sprocket 121 which engages a driving gear 124 secured to the shaft 108. Shaft 117 drives a second sprocket 125 for driving the loading conveyor B which is connected by drive chain 126 to a rear sprocket 127 on shaft 128 which transmit driving power to a front sprocket 129 on shaft 128 that is linked by a drive chain 130 to a sprocket 131 on the driving roller 132 (see FIG. 1) of the conveyor B, cooperating with an idling roller 133 of the conveyor.

Another secondary shaft 134 supported in bearing 135 receives its drive through a worm gear assembly 136 from the main shaft 115. Shaft 134 provides driving power to a pair of cams 137 and 138 which operate the bottle register unit K, and a cam 139 which operates the bottle holding clamps F disposed on turret G. A first sprocket 140 on shaft 134 provides drive through a chain 141 to a pair of sprockets 142 and 143 on shaft 144 supported in bearings 145. The sprocket 143 in turn provides drive through a chain 146 to a sprocket 147 connected to the drive roller 148 of unloading conveyor C. A second sprocket 149 attached to shaft 134 is connected by a chain 150 to a sprocket 151 on the input shaft 152 of the bottle gripping finger drive mechanism of bottle transfer unit E. The input shaft 152 further includes a worm gear 153 coupled to the driving gear 154 on the central finger actuating shaft 155. The mechanism for pivoting the bottle transfer unit E derives its operating power from a sprocket 156 on the motor shaft, which is coupled by a drive chain to the input sprocket 157 of a gear box 158. The output sprocket 159 drives connecting drive chains 160 and 161 through a linking sprocket 162 to impart driving power to the input sprocket 163 of the transfer unit E.

A third secondary shaft 164 supported in bearings 165 receives driving power from a sprocket 166 on the motor shaft which is connected by means of a drive chain 167 to a sprocket 168 on secondary shaft 164. The bottle register unit K receives its operating power from a pulley 169 attached to shaft 164 which is connected by means of a drive belt 170 to pulley 171 supported in a bearing 172. A flexible shaft 173 rotatably attached to pulley 171 is utilized to operate part of the register unit K as hereinafter described. A second pulley 174 attached to shaft 164 is utilized to provide power to the gear boxes 175 by means of lug belts 176 coupled to input pulleys 177 which operate the pantograph linkages P and Q controlling the movement of the printing frames M and N.

Stepping turret G is operated from the output shaft 113 of motor R by means of a pulley 178 on shaft 113 which is chain coupled to the drive pulley 179 of a gear box 180.

It is to be understood that the speed of operation of the various components of the apparatus is governed by a proper selection of gear and sprocket ratios to coordinate the interaction of the components during the various operations performed thereby during the operating cycle of the apparatus.

STEPPING TURRET ASSEMBLY AND BOTTLE HOLDING CLAMPS

(A) Stepping turret assembly

As shown in FIGS. 1, 3, 4 and 7 the stepping turret G is constructed in the shape of a seven-sided pyramidal hood formed by triangular plates 190 suitably secured to frame members 191, and a tubular hub 192 attached by weldments at the apex of the turret. Referring to FIG. 7, the turret hood revolves around a stationary central supporting shaft 193 which is secured at the top end in a socket 194 suitably attached to the frame of the housing A. At its bottom end, the shaft is supported in a fixed bearing housing 195 by means of a nut 196 and spacing washer 197.

The central hub 192 is rotatably disposed in relation to the fixed central support shaft 193 by means of its attachment to an enlarged recessed end 198 of a tubular drive shaft 199 concentrically disposed on the lower end of the shaft within the fixed housing 195. This attachment comprises an annular member 200 welded at 201 to the base of the hub and an annular plate 202 attached by a weldment 203 to the enlarged end of the drive shaft 199. An annular centering projection 204 on the top surface of the plate 202 is received in the lower end of the annular member 200 and the plate is attached thereto by a plurality of bolts 205. Roller bearing assemblies 206 and 207 are employed to rotatably attach tubular drive shaft 199 in the fixed housing 195. The outer race of the lower bearing 206 is seated in the end of a tubular retainer 208 welded to the bottom of the housing, and the top end of the inner race abuts the end edge of the lower hub 209 on a gear 210, splined at 211 to the drive shaft and is held in place by a lock nut 212 threaded on the end of the drive shaft.

The inner race of the top roller bearing assembly 207 is seated against the drive shaft between shoulders formed at the enlarged end 198 of the shaft 199 and a spacing sleeve 213 abutting the upper hub 214 on gear 210. The outer race of bearing 207 is received in a central opening in an end plate 215 attached by bolts 216 to a flange 217 welded to the side wall of the housing, and is seated in a retaining ring 218 welded to the end plate, which also supports an oil seal 219 with respect to the enlarged end of the drive shaft. The top end of the shaft 193 is stabilized by a ball bearing assembly 220 having its outer race seated against the inner edge of the centering projection 204 on the plate 202. The inner race of the bearing is secured against a shoulder formed by an enlarged head 221 of a sleeve 222 disposed on the fixed shaft 193 by the snap ring 223 which holds the bearing 220 to the sleeve 222. A set screw 224 is utilized to fix the sleeve 222 to the shaft which serves to maintain the outer race of the bearing firmly seated on the centering projection 204.

The stepping mechanism, comprising a Geneva cross gear assembly 225, is disposed in a housing 226 suitably attached to fixed housing 195 and the support frame of the apparatus. Drive is supplied to the Geneva cross gear assembly from a gear box 180 (see FIG. 6) whose input shaft 227 is coupled to the output shaft 113 of the motor by means of the coupler assembly comprising an attached sprocket 179 operating from the transmission assembly as shown in FIG. 6. Stepping action of the Geneva cross gear assembly 225 is attained by means of a roller bearing follower member 228 attached by a shaft 229 to the outer end of a crank arm 230 continuously driven in a counterclockwise direction by the output shaft 231 of the gear box to which its inner end is attached. Upon each revolution of the follower bearing 228, the follower bearing engages one of the six arcuate slots 232 in the Geneva gear 233 and turns it one sixth of its circumference in a clockwise direction about its mounting shaft 234. The Geneva gear will remain at rest during the period the follower 228 leaves one slot until it engages the next slot. This stepping rotary action of the Geneva gear is transmitted to the turret G by a gear 235 secured to the shaft 234 of the Geneva gear which drives a pinion gear 236 and an attached larger gear 237 mounted on a common shaft 238 which in turn drives a worm gear assembly 239 disposed on the shaft 240 which is in engagement with the gear 210 splined to the turret drive shaft 199.

At its upper end, fixed shaft 193 rotatively supports an adjustment assembly 241 which functions to adjust the height of the nose cones 242 of the seven bottle holding clamps F mounted at the junctions of plates 190 on the sides of the turret. This assembly comprises an inner sleeve 243 rotatably disposed on the fixed shaft having laterally extending operating arms 244 keyed to a top flange 245 thereof and retained in place by a snap spring 246. A central plate 247 extending outwardly from the mid portion of the sleeve is supported on the top surface of a plate 248 through which the lower portion of the sleeve depends. At its outer periphery the plate extends into an inner groove on a ring member 249 welded to hub 192 and is retained therein by means of a snap spring 250. At its lower end the sleeve 243 retains a spacing sleeve 251 disposed against the bottom of the plate 248 and the top of the bevel gear 252 fixed to the bottom end of the sleeve. A locking member 253 in the form of a sleeve is threadedly engaged with the top section of the inner sleeve 243 and is provided with turning handles 254. The locking member 253 may be tightened against the top of the central plate 247 to prevent rotation of the inner sleeve 243 with respect to the hub 192. Upon loosening the locking member 253 by means of handles 254, bevel gear 252 may be turned by revolving handles 244 to adjust the height of the hose cone 242 in a manner to be described.

(B) Bottle holding clamps

The seven bottle holding clamps F mounted on the stepping turret, individually, comprise the structural arrangement shown in FIGS. 7-11. One clamp F is shown in FIG. 7 as it is associated with the structure of the stepping turret G. One such unit is affixed to the turret G at each of seven slots formed between the adjacent edges of the triangular plates 190. Each clamp comprises a tubular member 269 welded at its upper end to the turret hub member 192. Internally, the tubular member 260 supports a depending hollow tube 261 provided on its rear side with a longitudinally extending slot 262, and supports at its lower end an externally disposed tubular member 263 secured thereto by weldment 264. A push rod 265 extends through the tube 261 and is slidable vertically therein by means of upper and lower bushings 266 supporting bearing sleeves 267 which receive reduced end sections 268 of the push rod 265. A lower threaded section 269 of the push rod is provided with a stop nut 270 below which is disposed an internally threaded adjustment member 271. As seen in FIG. 8 a pin 272, attached to a cross bar 273, extends through the slot 262 in the tube 261 and into an aperture 274 in the side of the adjustment member 271. On the reduced portion of the push rod 265, a coil spring 275 is concentrically mounted in bearing relation between upper and lower step washers 276 and 277, the lower washer 277 abutting a shoulder formed by an enlargement 278 on the rod, and the upper washer abutting the top bushing 266. A bevel gear 279, in engagement with the bevel gear 252 of the adjustment assembly 241, is slidably coupled to the protruding top end of the push rod 265 by means of a loosely fitted key 280 disposed in vertical slots in the base of the gear and a loose fitting end slot 281 in the push rod 265. As shown more clearly in FIG. 10, a bolt 282 is adjustably received in an internally threaded recess 283 in the bottom end of the push rod and includes a lock nut 284 which bears against the bottom of the rod.

When a bottle holding clamp F is positioned by the turret in the first work station opposite the transfer unit E, the head of the bolt 282 will be disposed in the path of a roller cam 285 attached to one arm of a bell crank 286 which is biased by a spring 287, as seen in FIG. 1, to have its other arm in engagement with the cam 139 on the shaft 134. As the roller cam moves upwardly in response to the movement of the bell crank 286 by cam 139, it will contact the head of the bolt 282 and cause the push rod 265 to move upwardly against the return bias of the spring 275. The slot in the upper end of the rod will slide past the key disposed inside the gear 279 without elevating the gear while the pin 272, carried by the adjustment member 271, moves in the tube slot 262. This movement serves to raise the nose cone 242 in a manner to be described, to permit the transfer unit E to insert or remove bottles from the holding clamp F.

Referring to FIGS. 8 and 9, it will be seen that the hollow tube 261 containing the push rod 265 is positioned between two parallel tubular shafts 288 which are welded at their upper ends to the turret hub 192. The lower ends of the shafts 288 are fixed by bolts 289 in socket members 290 welded to the sides of a bottle chuck assembly 291, attached by brackets 292 to the base of the turret assembly. Two sleeve members 293 are slidably disposed on shafts 288 which are connected at their rear sides by weldments to the cross bar 273 and interposed spacers 294. At the front sides, the sleeves are similarly joined by a plate 295 and spacers 296. The bracket 297, on which the nose cone 242 is rotatably mounted, is attached to the plate 295 by bolts 298. Since the cross bar 273 attached to the sleeves 293 is secured to the adjustment nut 271 by pin 272, it is apparent that the nose cone 242 will move vertically as a result of similar movement of the adjustment nut. Hence, when the roller cam 285 moves the rod 265 upward the nose cone will move upward along with the nut 271 on the rod and pin 272 in the slot 262, thereby freeing the bottle previously held between the nose cone and a bottle seat 299 of the chuck assembly 291 to permit its removal by the transfer unit E. Similarly the nose cone is raised when the transfer unit places a bottle in the holding clamp. This arrangement also enables the height of the nose cone to be adjusted to a particular bottle height by the adjustment assembly 241. In this case, when pressure of the lock sleeve 253 (FIG. 7) against the plate 247 is released by rotation of the handles 254, gear 252 may be turned by arms 244 to either raise or lower the member 271 on the rod 265. Since the rod 265 will be rotated and the member 271 restrained from rotating by the pin 272, the cross bar 273 will travel up or down the threaded portion 269 of the rod, depending upon the direction in which the arms 244 are turned, carrying with it the nose cone.

FIGS. 10 and 11 show the details of the bottle chuck assembly 291 located at the bottom of the holding clamp F. The assembly functions to non-rotatively support the base of a bottle positioned in the clamp, but is provided with means permitting rotation of the bottle by the register unit K to position the molding seams of the bottle. The assembly is attached to the lower ends of the shafts 288 and member 263 by weldments and bolts 289, as previously described. A laterally extending hollow rectangular support 300, attached at one end by welded connection to the member 263 and the socket members 290, supports at its outer end by welded connection a vertically extending journal 301. The journal rotatably supports a bottle chuck comprising a tubular drive member 302 having a tubular clutch member 303 concentrically disposed in its bore and secured thereto by a set screw 304 disposed in a threaded aperture 305 common to both members. Members 302 and 303 are rotatably secured in the journal 301 by a lower roller bearing 306 interposed between the outer surface of members 302 and the inner surface of the journal 301, and an upper ball bearing assembly 307 having its outer race retained in a seat 308 inside the journal 301 by a snap spring 309, and its inner race retained between the upper end of the member 302 and a shoulder 310 formed by an enlarged head 311 on the member 303. A drive shaft 312 is concentrically and rotatably supported in the base of the clutch member 303 by a lower sleeve bearing 313 interposed between the shaft and the base of the clutch member, and an upper roller bearing 314 positioned between the wall of an enlarged recess 315 in the top end of the clutch member, and an enlarged section 316 on the drive shaft.

The top end of the shaft 312 concentrically supports, in fixed relation on a shoulder formed by the enlarged section 316, a second clutch member 317 having a downwardly projecting conical recess 318 which receives a mating conical surface 319 on the enlarged head 311 of the clutch member 303. The bottle seat 299, having a central bottle seating recess 320 defined by a rim 321, is disposed on the top of the drive shaft and keyed thereto by a pin 322 extending into the clutch member 317. At its lower end, the shaft 312 supports in threaded relation a drive head 323 provided with a downwardly facing conical drive surface 324. The drive head is locked on the shaft by a set screw 325 received in a threaded aperture common to both the shaft and the drive head. The lower end of the drive member 302 includes an enlarged annular drive head 326 having drive recesses 327 in the lower surface thereof. A central recess 328 formed in the drive head 326 surrounds the shaft drive head 323 with their adjacent surfaces well spaced. The outer surface of the drive head 326 is rotatably disposed in a recess 329 formed in a bottom flange 330 of the journal.

A detent is provided for the drive head 326 comprising a roller 331, rotatably secured on a pivoted mounting plate 332, which is received in an arcuate recess 333 in the side of the drive head through an opening 334 in the bottom flange 330 of the journal. Mounting plate 332 is pivotally disposed adjacent to the bottom of the hollow rectangular support 300 by an upstanding shaft 335 fixed at its lower end to the plate and pivotally secured in a journal 336 attached to the side of the support 300. The roller 331 is biased toward recess 333 in the driving head by a tension spring 337 extending through an opening 338 in the support 300. One end of the spring is received on an upstanding pin 339 secured to the plate 332, and the other end is attached in the eye of a cotter pin 340 secured to the opposite wall of the support 300 by protruding bent ends 341 bearing against a stop washer 342.

The above arrangement permits the bottle disposed in the seat 299 to be rotated by rotation of the chuck drive head 326 due to the downward pressure of the bottle imparted thereto through the nose cone 242 by spring 275 on the push rod 265. The downward pressure of the bottle causes the mating conical surfaces 318 and 319 of the clutch member to engage, thereby connecting the drive head 326 to the bottle seat 299 to which drive head 323 is fixed. Also, a bottle in the seat 299 may be rotated independently of the drive head 326 by exerting an upward force on the drive head 323 to disengage the clutch surfaces and then rotating the drive head 323. The modes of operation of the bottle chuck are utilized by the bottle register unit K to establish a reference position of the bottles with respect to their holding clamps, and by the printing drive spindle L during the printing process as will be subsequently described.

BOTTLE TRANSFER ASSEMBLY

Briefly, the bottle transfer assembly E functions to simultaneously remove decorated bottles from the holding clamps F as they are stepped into the first work station of the turret and insert in their place undecorated bottles. The construction of the assembly for effecting this result is shown in FIGS. 12–20. A vertical cross-section of the assembly is shown in aligned relationship in FIGS. 12 and 13. The lower part of the assembly, as shown in FIG. 13, includes an oscillatory drive system W for the bottle transfer head 345, shown in FIG. 12; and a drive system Y for operating a cam driven gear train assembly 346 which functions to open and close the bottle gripping finger assemblies T and U carried on the transfer head, as shown in FIGS. 17, 19 and 20, and, also for operating a bottle accelerating device 347 which rapidly moves bottles deposited in the unloading conveyor C by the finger assembly U out of range of the finger assembly as it is moved in a reverse direction by the transfer head.

The lower part of the assembly, comprising drive systems W and Y and the bottle transfer head 345 are interconnected by concentric shafts, including a central shaft 155 which operates both the gear train 346 and the bottle accelerating device 347. As shown in FIGS. 12 and 13, the central or finger actuating shaft 155 is rotatably supported at its lower end in a gear retainer 349 welded to the bottom of a gear box 350 by a ball bearing assembly 351 secured against a shoulder 352 inside the retainer by a snap spring 353. The top end of the central shaft, which extends above FIG. 12, is suitably supported in rotary relation on a frame member in the housing A. Oil seals 354 and 355 are provided adjacent the ends of the central shaft in the retainers 349 and 356. The outer shaft is rotatably related to the central shaft by an interposed sleeve bearing 357 seated within the lower end of the outer shaft, and a sleeve bearing and oil seal assembly 358 rotatively engaging the upper outside surface of the outer shaft. The bearing and seal assembly 358 is secured inside a recessed lower portion of a cylindrical support 359 surrounding the top end of the outer shaft, whose upper portion is secured to the central shaft by a key member 360.

Generally, the bottle transfer head 345 comprises an upper housing 366 and a base platform 367 interconnected adjacent their rear ends by welded connection to a tubular post 368 concentrically disposed around the central and outer shafts, and reinforcement plates 369 and 370; and at their front ends by four pivotally attached mounting posts 371 which support the bottle gripping finger assemblies T and U, as shown in FIGS. 12 and 19. To permit oscillation of the transfer head when the assembly is in operation, it is pivotally mounted on the outer shaft 348 by means comprising a housing 381, enclosing the oscillatory drive mechanism rotatably mounted with respect to the tubular shaft 348, the previously described assembly 358 at its top end; sleeve bearings 372 and 373, disposed between tubular support 368 and the outer shaft; an oil seal 374 held against the bottom edge of the bearing 373 by a retainer 375, secured to the platform 367 by bolts 376; and a supporting lock nut assembly 377 mounted on the outer shaft below the retainer 375 and resting on a drive sleeve 378 fixed to the outer shaft by a key member 379.

The drive system W for oscillating the transfer head is enclosed in the housing 381 which is rotatably mounted with respect to the outer shaft 348 by upper and lower ball bearing assemblies 382 and 383. Ball bearing 382 is secured in a retainer 384, also mounting an oil seal 385, which is welded to the top of the housing. The inner race of the bearing abuts a reduced lower portion of the drive sleeve 378 and the top of a second drive sleeve 386 keyed to the outer shaft at 387. The other supporting bearing 383 for the housing is secured by a snap ring 388 in the bottom of a tubular connecting member 389 secured by weldments to the bottom of the housing 381 and the top of the gear box 350. The inner race of bearing 383 seats at its bottom edge, on a retainer ring 390 welded to the end of the outer shaft and at its top edge against a spacing sleeve 391 disposed below the drive sleeve 386. Frame members 392 and 393 are secured to the outer ends of the housing 381 to support the transfer assembly in the apparatus.

As shown in FIG. 6 the drive system W receives power through a sprocket 163, driven in one direction, attached to the input shaft 394 rotatably supported by ball bearings 395 and 396 in a depending hub 397, welded to the bottom of the housing 381. Rotation of the input shaft 394 is imparted to a crank arm 398 secured on the input shaft by weldment 399. The outer end of the crank arm is rotatably connected to one end of a connecting rod 400 by a pivot pin 401 fixed on the crank arm and received in a bearing 402 in the end of the connecting rod. The other end of the connecting rod is pivotally attached to a lever arm 403 by a pivot pin 404, fixed in an aperture 405 at one end of the lever arm, and received in a ball bearing assembly 406 seated in a recessed opening 407 in the end of the rod. The other end of the lever arm is welded to the drive sleeve 386 keyed to the outer shaft. Upon rotation of the input shaft 394, the outer end of the crank arm 398 and the end of the connecting rod pivotally connected thereto rotate in the direction of the input shaft. With a proper selection of the lengths of crank arm 398, connecting rod 400 and lever arm 403, the outer end of the lever arm and the end of the connecting rod pivotally attached to it will be driven in an oscillatory motion about the axis of the tubular shaft 348. Since the opposite end of the lever arm 403 is fixed to the drive sleeve 386, keyed to the outer shaft, the outer shaft is also caused to oscillate in response to rotation of the input shaft 394. Accordingly the upper drive sleeve 378, also keyed to the tubular shaft, will oscillate in the same manner.

The oscillatory motion of the drive sleeve 378 is imparted to the bottle transfer head, which is free to rotate with respect to the outer shaft as previously described, by a crank arm 408 rigidly connected at one end to the drive sleeve and slidably and rotatably received on a depending shaft 409 suitably fixed by flange 410 to the base platform 367 of the transfer head. The range of oscillation of the transfer head is such as to position the loading finger assembly T over the bottle receiving position X on the loading conveyor B at one extreme of its motion, and to dispose unloading finger assembly U in an unloading position over conveyor C at the other extreme of its motion.

The drive system Y for operating the gear train assembly 346 and the bottle acceleration device 347 comprises the central drive shaft which receives its operating power from an input shaft 152 driven by an attached sprocket 151 which is coupled to the power tansmission system in the manner described in conjunction with FIG. 6. The input shaft is rotatably supported by a ball bearing assembly 411 in a cylindrical hub 412 of the gear box 350. The inner race of bearing assembly 411 is seated on a sleeve 414 fixed to the shaft and its outer race is retained against a shoulder 415 adjacent the end of the hub 412 by an annular member 416 which also retains an oil seal 417 on the shaft. The input shaft 152 rotates the shaft 155 by means of an attached worm gear 418 which engages the drive gear 154 fixed on the central shaft.

As shown in FIGS. 12, 17 and 18, the cam driven gear train assembly 346 for opening and closing the bottle gripping finger assemblies T and U, comprises a rotating cam 419 for opening the finger assemblies, which is adjustably fixed to the shaft 155 above the housing 366, and a similar cam 420 for closing the finger assemblies, is disposed inside the housing. The mounting means for cam 420 comprises a shoulder 421 on the cylindrical support 359 against which the cam is held by securing bolts 422 threadedly received in the cam and having the shanks thereof disposed in holes 423 of a plate 424 positioned on a second shoulder 425 on the cylindrical support. A cam follower assembly operated by the two cams comprises a sector gear 426 inside housing 366 which includes a fixed upstanding spindle shaft 427 rotatably secured in the top wall of the housing with a portion protruding above the housing. An arm 428 of the sector gear rotatably supports a roller cam follower 429 on its end adjacent the closing cam 420. A second arm 430 fixed at one end on the protruding end of the shaft 427, is similarly provided with a roller cam follower 431 disposed adjacent the cam 419. Upon rotation of the cams by the central shaft, the cam followers will maintain constant rolling contact with the cams as a result of their mounting arms being fixed relative to each other. In this manner sector gear 426 moves back and forth in an oscillatory motion about spindle shaft 427 in accordance with the configuration of the cams.

The oscillatory motion of the cam follower assembly is imparted to a pinion gear 432, engaged by the sector gear. The pinion gear is attached to a shaft 433 rotatively secured in the housing by an enlargement 434 at the top and a nut 435 threaded on the bottom of the shaft. This shaft also fixedly carries a gear 436 below the pinion gear which is in driving engagement with a first pair of coupled gears 437 and 438 fixed to depending shafts 439 and 440. A second set of coupled gears 441 and 442 fixed on shafts 443 and 444, disposed adjacent an opposite edge of the housing, are driven by gear 432 through a mutually engaged idler gear 445.

The four finger assembly mounting posts 371 on the front of the transfer head are provided at their top ends with sockets 446 in which the shafts 439, 440, 443 and 444 are fixed by set screws 447. At their lower ends, reduced sections 448 are pivotally received in bearings 449 carried by platform 367. By this arrangement, adjacent mounting posts on each set of shafts 439, 440 and 443, 444 pivot in opposite directions toward and away from each other in response to the movements of their driving shafts.

BOTTLE HOLDING CLAMPS

As shown in FIG. 19, the bottle gripping finger assemblies T and U each comprise a pair of arcuate bottle gripping fingers 450 and 451, pivotally connected at their rear junction 452. The forward end of finger 450 is provided with two bottle engaging roller members 453 positioned on opposite sides of an arcuate recess 454. The forward end of the finger 451 pivotally supports a plate 455 which includes a similarly disposed roller 456 at the forward end.

The rear end of the plate 455 is biased toward the arm by a tension spring 456A. Adjacent their front ends, each of the fingers includes an upstanding shaft 457 on which mounting arms 458 are pivotally attached.

As shown in FIGS. 14–15, each mounting post 371 is provided with a relatively long upper slot 459 and a shorter lower slot 460, each of which are provided with mounting assemblies 461 for attaching the outer ends of the arms 458 on the finger assemblies, on each pair of mounting posts. The mounting assemblies each comprise a rear rectangular plate 462 slidably disposed in inner guides 463 on the sides of the slots, and a front adjustment member 464 including a recess 465 which engages guide surfaces 466 on the sides of the posts. A bolt 467 extends rotatively through the rear plate 462 into threaded engagement with the adjustment member 464, whereby upon loosening the bolts, the mounting assemblies, including finger assemblies support thereon, may be adjusted along the slots to accommodate the size or configuration of the bottles being decorated by the apparatus. The front side of the adjustment member is provided with an arcuate surface 468 and the top surface includes a similarly curved groove 469. The end of each mounting arm 458 is provided with an arcuate recess 470 and a projecting portion provided with an arcuate tongue 471 each of which conform to the arcuate surface and groove on the adjustment member. By this means, the arms of a finger assembly may be adjustably positioned on the adjustment members so as to not impede the pivotal action of the assembly. When a satisfactory adjustment has been attained the arms are fixed to the adjustment member by a screw 472 threadedly received in the adjustment member, which is slidably disposed in a slot 473 provided on a depending section on the end of each arm.

As shown in FIGS. 19 and 20, when the sector gear 426 of the gear train assembly 346 moves in a clockwise direction the mounting posts will pivot away from each other, as viewed from the front in FIG. 19, thereby pivoting the fingers to an open or bottle receiving position for assembly T and a bottle releasing position for assembly U.

To permit adjustment of the closing range of the finger assemblies, whereby the desired gripping force can be attained for different sized bottles, the drive shafts 439, 440 and 443, 444 are provided with means permitting them to be rotated with respect to their driving gears. Each drive shaft, such as 440, shown in FIG. 12, comprises a central member having a bottom section 474 of greatest diameter, on which mounting posts 371 are secured, and a top section 475 of smaller diameter, which is threaded adjacent its end extending beyond the top of the housing 366. A sleeve 476 positioned on the top section 475 of the shaft, comprises an elongated bottom part of the same diameter as the bottom section of the central shaft is fixed to gear 438, and extends through a bearing and oil seal assembly 477 disposed in a retainer 478 attached to the bottom of the housing. The top of the sleeve is provided with an enlarged conical head 479 separated into two flexible sections by longitudinal slots 480. The conical head 479 of the sleeve is received in a mating conical recess 481 in the bottom of a tubular member 482 positioned on the central shaft above the sleeve. The top section of the central shaft extends through a ball bearing assembly 483 disposed in the top of the housing 366. The bottoms of both races of the bearing engage a washer 484 disposed on top of tubular member 482. At the top end of the bearing, a securing plate 485 engages a laterally extending flange 486 on the outer race and also a similar flange on the ball bearing associated with the shaft 439, and secures the bearings to the housing by means of bolts 487, as seen in FIG. 18. The bearing associated with shafts 443 and 444 are similarly secured by housing plate 488. The top of the inner race rotatably extends into an aperture in the plate and is disposed to be contacted by the lower end of a sleeve nut 489 threaded on the top end of the central shaft.

With the above assembly the mounting posts 371 may be fixed to the driving gear 438 by tightening sleeve nut 489, which causes conical recess of member 482 to force the two sections of the conical head on sleeve 476 into binding engagement with the central shaft, and to lock both races of the ball bearing 483 against the washer 484. To release the locking action of the two conical surfaces and permit relative rotation between the driving gear 438 and attached sleeve 476, the nut 489 is loosened on the central shaft. This provides sufficient slack between the bottom of the nut and the conical head of the sleeve 476 to release engagement of the conical surfaces and free the lower ends of the bearing 483 from locking engagement with the washer 484, thereby freeing the parts to permit relative rotation between them.

Accordingly, when it is desired to adjust the closing range of the finger assemblies T and U to a different size bottle, the sleeve nuts of adjacent mounting posts are loosened to free the central shafts, and attached mounting posts from the sleeve 476; thus allowing the posts to be turned by hand to adjust the fingers of the assemblies T and U, after which the nuts are tightened to fix the posts and driving gear in the adjusted relationship.

It is necessary to slightly elevate a bottle each time it is put into or removed from a holding clamp F to permit clearance of the rim 321 on the bottle seat 299 of the clamp. To accomplish this, a lifting cam 490 having a downward facing annular cam surface 491, is recessed in the top wall of the housing 366 in spaced relation to the support 359 on shaft 155. A recessed mounting cap 492, fixed to the housing plate 488 by bolts 493 extending through mounting ears 494 of the cap, secures the cam to the housing by means of bolts 495 disposed in slots to permit adjustment of the cam. A roller cam follower 496 is positioned beneath the cam surface 491 by a pin 497 extending through its mounting shaft which is disposed in a raised mounting lug 498 on the plate 424 fixed to the cylindrical support by bolts 422, as previously described. The cam surface is provided with suitably positioned elevations to cause the transfer head 345, comprising the housing 366, to be elevated on outer shaft 348, with respect to the cam follower 496, and the attached shaft 155 each time the finger assemblies T and U position a bottle on or remove it from a holding clamp F at the extreme pivot positions of the transfer head.

The bottle transfer assembly is further provided with a bottle accelerating device 347 shown in FIG. 13, which functions to rapidly move the decorated bottles deposited on unloading conveyor C by finger assemblies U, to the left so they will be removed from the path of the finger assemblies U as the bottle transfer head 345 makes its return pivot in a clockwise direction, as seen in FIG. 5. The accelerating device comprises an upright shaft 500 supported in bearings 501 and 502, which are attached to frame members 503 and 504, respectively of the decorating apparatus, adjacent unloading conveyor C and to the left of the transfer assembly E, as viewed in FIG. 5. Shaft 500 is provided with a plurality of angularly extending fingers 505 adjustably secured adjacent the top of the shaft in positions to contact the decorated bottles as they are deposited on conveyor C. The mechanism is operated by a cam 506 secured to the bottom of central shaft 155 by means of fitting 507, washer 508 and a nut 509 threaded on the shaft. The shaft 500 is made to pivot back and forth in accordance with the configuration of cam 506 by the movement of a crank arm 510, fixed to the shaft by a pin 511, as the arm is actuated by the lateral movement of a roller cam follower 512 rotatably attached to the outer end of the arm by a mounting pin 513. A tension spring 514, fixed to a frame member 515 at one end, is attached to a lever 516 fixed to shaft 500 to maintain the cam follower in contact with the camming surface.

The above described bottle transfer assembly is made to function in the manner described in conjunction with the various operating parts by proper selection of gear ratios and configurations of the various operating cams.

BOTTLE REGISTER UNIT

Most mass manufactured glass containers have slightly raised, diametrically opposed, molding seams extending down their sides, and some specialized containers are manufactured with decorative protuberances. Since such obstructions materially affect the quality of printing impressions it is necessary to properly orient the bottle with respect to the printing frames so that such obstructions will not interfere with the printing process. Also, it is frequently required that decorations be provided on specific areas of the containers. The present invention includes a bottle register unit K which functions to automatically position the bottles in a precise reference orientation with respect to holding clamp F. Since there are a large variety of bottles or other type containers available, the unit is provided with two types of devices for establishing an index position for the various types encountered. Additionally, the unit includes suitable adjustment means to compensate for differently positioned indexing marks, lugs or detents on the containers with respect to the molding seams or other type obstructions.

Generally, manufacturers employ two types of indexing means on bottles and other type containers to facilitate subsequent placement of printed decorations or labels on the containers. Some provide small indentations or lugs disposed with a specific orientation with respect to the molding seams, while others may employ similarly placed markings flush with the surface of the containers. When high production decorating apparatus is utilized for the decorating process the lug or indentations may conveniently be sensed by a mechanical feeler device, however, the provision of flush type markings generally requires the use of photoelectric sensing apparatus. The photoelectric apparatus has the additional advantage of being able to sense the molding seams themselves, when no other indexing means has been provided.

Referring now particularly to FIGS. 21-23 and 26, which show the structure of the bottle register unit K, the unit is disposed in a housing 520 having various supporting members and configurations to provide proper support for the various elements of the unit. The unit comprises an output head 521 which includes a chuck driving head 522 having driving lugs 523 for driving the bottle chuck assembly 291, shown in FIGS. 10 and 11, supported on the base of the bottle holding clamps F; and a bottle driving spindle 524, having a conical driving face 525 for independently rotating the bottle seat 299 of the chuck assembly. Additionally, the unit includes two drive systems, the first serves to rotate the driving head and also, to control by reciprocating motion the engagement of the driving head 522 and spindle 524 with the bottle chuck assembly 291. The second drive system functions to rotate the bottle drive spindle 524, but may be disengaged therefrom by means of a clutch responsive to either a mechanical or electrical device for sensing indexing means on the bottles.

Generally, the first system, for rotating drive head 522 and reciprocating both head 522 and spindle 524, comprises an oscillating input shaft 526 coupled through a sector gear 527 and pinion gear 528, to effect oscillation of a drive distributing gear 529. The gear 529 drives by direct engagement a cam supporting gear 530, which controls the reciprocation of spindle 524; and through a lost motion linkage drives a pair of coupled gears 531 and 532 which control both rotation and reciprocation of chuck drive head 522.

Input shaft 526 receives its oscillatory drive from a pair of cams 137 and 138 located on transmission shaft 134, as shown in FIG. 6. The cams 137 and 138 impart oscillatory motion to a connecting rod 533 through roller cam followers 534 and 535 pivotally secured in a fixed relation on a rigid lever arm 536 which is rotatably disposed on a fixed pivot pin 537, to maintain both cam followers in constant engagement with their respective cams. The end 538 of the lever arm is pivotally attached to the lower end of the rod 533 by a pivotal connection 539. The upper end of the rod 533 is pivotally connected by a nut and bolt assembly 540 to a lever arm 541, rigidly attached to the input shaft 526, thereby causing the lever arm 541 and the input shaft 526 to oscillate in response to the movement of the connecting rod 533. Rigid connection of lever arm 541 to the shaft 526 is effected by a sleeve 542, to which it is welded, received on the end of the input shaft and secured thereto by key members 543 and a nut 544, threaded on the shaft to dispose a washer 545 in abutment with an end shoulder of the shaft and both sleeve 542 and attached end of the lever arm 541. A bearing 546 and bearing spacer 547 are concentrically disposed on the sleeve 542 in a journal 548 welded to the housing 520. At the rear end, the input shaft is rotatably secured in the housing by a ball bearing assembly 549 having its inner race disposed between a retainer sleeve 550 which abuts the bearing 546 and a shoulder formed by an end recess 551 on the hub of the sector gear 527 which abuts against an enlarged section 552 on the shaft, the sector gear being welded at 553 to the input shaft end. The outer race of the bearing assembly seats between the rear flange 554 of a retainer 555, attached to the housing plate 556 and a spacer sleeve 557 recessed in the housing wall 558.

Pinion gear 528 disposed on the shaft 559 receives its drive by direct engagement with the sector gear 527. The shaft 559 is rotatably supported at its front end, by a sleeve bearing 560 disposed in an opening 561 in the housing wall 558 and an attached closed journal 562. At its rear end the shaft is supported by a ball bearing assembly 563 having its outer race seated in a recess 564 provided in a journal member 565, attached to housing wall plates 566 and 567. The inner race is seated on a sleeve bearing 568 on the shaft 559. A compression spring 569 coaxially disposed on shaft 559 bears between an annular forward flange on bearing 568 and a washer 570 abutting against the rear of the pinion gear 528 to maintain seating pressure against the inner race of the bearing 563. The power distributing gear 529 is mounted on the shaft 559 adjacent the pinion gear 528 which are fixed as a unitary structure by a connection comprising a central recess 571 in the gear 529 which receives a hub 572 on the pinion gear 528 and a set pin 573 extending through the gear 529, the hub 572 and the shaft 559.

The combined gear and cam assembly comprising the gear 530, directly driven in oscillatory rotation by the power distributing gear 529, performs the sole function of advancing and retracting the spindle 524 in timed sequence with other operations of the register unit. As best shown in FIG. 26, the gear 530 is rotataby mounted on the spindle head drive shaft 574 journaled at its rear end in a sleeve bearing 575 seated in a journal 576 of the housing, and rotatably supported at its forward end by a plurality of elements. These elements comprise a rearwardly extending tubular section 577 welded at 578 on the shaft 574 and integral with the spindle drive head 524, which is both slidingly and rotatably supported in a rearwardly extending tubular section 579, integral with the chuck driving head 522, by an interposed sleeve bearing 580. The exterior surface of the tubular section 579 is rotatably supported in a sleeve bearing 581, abutting a shoulder formed by the chuck drive head 522, and seated in a cylindrical power head 582 by a roller bearing assembly 583. The attachment of power head 582 to the housing will be subsequently described.

To permit longitudinal movement of the spindle shaft 574 in the housing, the gear 530 is rotatably fixed on the shaft by means comprising a central annular member 584 fixed in a central opening 585 of the gear. The central annular member 584 receives in its inner bore the outer race of a ball bearing assembly 586 which is seated therein between inwardly projecting flange 587 and a snap ring 588. The inner race of the bearing assembly seats on the shaft 574 against a shoulder formed by an enlargement 590 on the shaft and a hub 591 integral with a drive gear 592, fixed to the shaft by a locking key 593. Two roller cam followers 594, pivotally disposed on shafts 595, fixed in apertures 596 in the central annular member 584, extend through openings 597 in the gear 530 and bear against the camming surface 598 on an annular cam 599, secured in a recess 600 of the housing. The assembly comprising the gear 530 is biased to the left, to maintain the cam followers against the camming surface, by a compression spring 601 disposed around the shaft 574. At its right end, the spring bears against a shoulder 602 inside the tubular section 579, and at its left end, against a flange 603 on a sleeve 604 slidingly engaging the shaft 574. The other side of the flange 603 and a portion of the sleeve form a seat which bears against the outer race of a ball bearing assembly 605 whose other race seats in a recess comprising the flange 587 on the annular member 584. The above arrangement permits the shaft 574 and spindle drive head 524 to reciprocate in sleeve bearings 575 and 580 in response to the movement of the cam followers 594 and the force of the spring 601.

The chuck driving head 522, as previously mentioned, both rotates and reciprocates along its longitudinal axis in response to the action of the directly coupled gears 531 and 532. As shown in FIG. 22, the gear 531 is disposed on the shaft 559 in rotary relation to the power distributing gear 529 by a ball bearing assembly 606 whose inner race seats on a projecting annular hub 607 on the gear 529, and its outer race in a central recess 608 in the gear 531. Power distributing gear 529 transmits driving power to the gear 531 through a lost motion connection comprising a laterally projecting drive finger 609 fixed to the gear 529 and extending through an arcuate recess 610 on the periphery of the gear 531 and into an arcuate lost motion slot 611 formed in a friction drive disc 612. Although slot 611 is shown as an enclosed slot formed in an annular portion of disc 612 it may, of course, comprise an arcuate recess if desired. The disc 612 seats in an annular recess 613 on the side wall of the gear 531, and is maintained in driving contact with the gear by the force of the spring 569 and its abutment against the housing plate 558. As shown in FIG. 25, the friction disc 612 comprises an annular portion 614 disposed in recess 613 and an outwardly extending arcuate section 615 in which the lost motion slot 611 is positioned.

The gear 532, comprising a combined cam and gear assembly, is disposed on the rearwardly extending tubular section 579, on chuck drive head 522 and coaxially situated with respect to the spindle drive shaft 574 by a cylindrical member 616 fixed in a central opening 617 in the gear. The gear 532 and member 616 are fixed to the tubular member 579 by the shaft 618, supporting roller cam followers 619, extending into openings 620 of the member 616. Roller cam followers 619 rotatably extend through openings 621 in the gear into contact with camming surface 622 on an annular cam 623 and are biased into engagement therewith by spring assembly 601, described in conjunction with the structure of gear 530. The cam 623 seats in a recess 624 at the rear end of the cylindrical power head support 582.

The cylindrical output head support extends through an opening 625 in the housing wall 626 and is provided with an oil seal 627 disposed in a recess 628 within the opening 625. The end of the member 582 extending through the wall 626 has two radially extending mounting plates 629 attached thereto by weldments 630 (see FIG. 21). The mounting plates 629 are provided with arcuate slots 631 through which securing bolts 632, equipped with bearing washers 633, extend into threaded engagement with the housing wall 626. Upon loosening the bolts 632 the cylindrical output head member 582 may be rotated to the extent of the slots 631, thereby providing for rotary adjustment of the cam 623 fixed to its other end.

As shown in FIGS. 26 and 27, an annular stop member 634 is rotatably positioned on a recessed area 635 on the cylindrical member 582. The annular stop member supports a worm segment gear 636 in a recess 637 by bolts 638 extending through a flange 639 at the front end of the member. An arcuate recess 640 formed in a front flange 641 on the stop member includes stop surfaces 642 and 643, as seen in FIG. 27. A stop finger 644 fixed adjacent the periphery of the gear 532 extends into recess 640 into position where it may engage the stop surfaces. As shown in FIG. 21, the worm segment gear 636 engages a worm gear 645 secured to a shaft 646, rotatably carried within a tubular housing 647. The tubular housing comprises an enlarged end secured to the housing wall 558 in communication with the worm segment gear.

An adjustment knob 648 on the end of the shaft may be rotated to adjust the position of the stop surfaces 642 and 643 with respect to the stop finger 644 carried on gear 532. The adjusted position of the knob 648 is maintained by the pressure of a compression spring 649 coaxially positioned on the shaft 646 between the knob and a fixed washer 650.

The structure of the register unit controlling the rotation of the spindle head 524 which responds to the index means sensing device to stop rotation of the bottle in an indexed position, comprises the spindle drive shaft 574. This shaft is driven through the engagement of its rearwardly attached gear 592 with the gear 651 which along with the gear 652 forms part of a clutch drive assembly. The gears 651 and 652, rotatably disposed on mounting shaft 653, are interconnected in face-to-face driving relation by the clutch assembly comprising a friction disc 654 fixed in a recess 655 in the end face of the gear 651 confronting an end face of an annular member 656, mounting the gear 652. The gear 652 is driven in constant rotation by means of worm gear 657, shown in FIG. 22, rotatably disposed in a tubular housing section 658 attached to the housing 520. As shown in FIG. 6, the worm gear is continuously driven by the flexible shaft 173.

Each gear 651 and 652 is rotatably mounted on the shaft 653 by ball bearing assemblies 659 and 660, respectively, having their inner races interiorly seated in the gear 651 and the annular member 656 supporting the gear 652 and their inner races seated on respective sleeve bearings 667 and 668 disposed on the shaft 653. One end of the shaft extends rotatably through an aperture in the housing wall 669 and its other end is in threaded engagement with an adjustment nut 670, slidably related by a key 671 in the slot 672 in the journal 673, attached to the housing 520. The frictional engagement of the clutch assembly, comprising the friction disc 654 and gears 651 and 652, is controlled by the pressure of the spring 674 coaxially positioned on the shaft 653 and bearing between an annular seat in the end of the adjustment nut 670 and a flange on the sleeve bearing 668. The pressure of the spring 674 may be adjusted to vary the degree of frictional engagement of the clutch assembly by rotation of the shaft 653 to change the longitudinal position of adjustment nut 670 along the slot 672 in the journal 673. Adjustive rotation of the shaft is effected by rotation of an adjustment knob 675 rotatably supported in the housing and having a sprocket 676, shown in FIG. 23, fixed on its shaft 677, coupled by a roller chain 678 to a spocket 679 fixed by key 680 to the inner end of the shaft 654.

The above arrangement operates to cause continuous rotation of the spindle drive shaft 574 until a restraining force is applied to the gear 651 by the action of the sensing means for detecting the indexing means employed on the bottles engaged by the output head 521. The indexing means may comprise either the mechanical feeler device shown in FIG. 37, which is utilized when indexing lugs or recesses are provided on the bottles by the manufacturer, or the photoelectric sensing device 681 which may be utilized to detect all types of index markings or merely the molding seams on the containers.

The mechanical index sensing device, shown in FIG. 37, comprises a support 682 pivotally mounted on a shaft 683, suitably attached to the register unit adjacent the bottles D disposed in the holding clamp F, positioned in front of the output head 521 by the turret G. An arm 684 is received in a socket 685 in one end of the member 682 and may be adjustably secured therein by a set screw 686. The free end of the arm 684 supports a finger 687 having a feeler point 688 which may be positioned by adjustment of the arm 684 and the nuts associated with the mounting shaft 683 to overlie a point in the path of rotation of an index recess 689 in the surface of the bottle. When the bottle is rotated by spindle driving head 524, as previously described, a biasing spring 690 attached to the rear of the support 682 will cause the feeler point 688 to enter recess 689 when it moves beneath the feeler point. When the spindle head 524 is moved to the right as viewed in FIG. 26 by the action of camming gear 530, independently of chuck drive head 522, the bottle in the bottle holding clamp F opposite the register unit K is rotated in the clamp assembly relative to the detented drive head 326 of the bottle chuck assembly 291 by virtue of the disengagement of the clutch surfaces 318 and 319 and the rotation of extended shaft 574. When the bottle has been rotated a sufficient degree to cause the feeler point 688 to engage a recess or lug 689 on the bottle, a wedging action is created through arm 682 between the recess 689 and pivot 683 to cause the arm to wedge against a vertically adjustable stop member 690A to provide a retarding force sufficient to stop rotation of the bottle in an indexed position. This force is also of sufficient magnitude to cause slippage of friction disc 654 with respect to driving gear 652 to thereby permit the bottle to remain in its indexed position until the spindle head 524 is retracted. The bottle then will remain in this position which is so related to the reference position of the chuck that the molding seams 691 will be disposed along the axis 692 upon reverse rotation and disengagement of the chuck driving head 522 in a manner to be described.

The photoelectric sensing device 681 comprises a housing assembly 693 secured to the housing 520 by bolts 694 and an oil seal 695. Mechanically this device includes a drive shaft 696 supported on ball bearing assembly 697, retained at its front in a bushing 698 threaded into the housing 693 and secured there by a lock nut 699. The rear end of the shaft is rotatably supported in a sleeve bearing 700 disposed in a retainer sleeve 701 secured within the housing 520. The ends of the shaft are provided with lock nuts 702 to secure the inner race of ball bearing 697 to the front of the shaft and a gear 703 engaged with the gear 651 on the rear end of the shaft. The gear 703 is further fixed to the shaft by a key member 704. Adjacent its front end, the shaft supports a clutch plate assembly 705 comprising a magnetic friction disc 706 supported on a plate 707 by means of a spacer ring 708 and rivet assemblies 709 at the outer edge of the plate, and by rivets 710 connecting the edge of a central aperture in the plate to a spacing flange 711 extending radially from a sleeve member 712 disposed on the shaft. Sleeve member 712 includes a key 713 for nonrotatably attaching it to the shaft and an end flange 714 which seats the end of a compression spring 715 positioned on the outer surface of the sleeve which bears against a seat 716 centrally located on the friction disc 706 to maintain the central portion of the disc against the spacing flange 711. The device is further provided with a solenoid coil 717 seated in the recess 718 in a rear section of housing 693 and secured therein by a face plate 719 secured over the front end of the recess by bolts 720 in confronting relation to the normally spaced magnetic friction disc 706. The solenoid coil is protected from the lubricating oil in the housing 520 by an oil seal 721 disposed between shaft 696 and the interior bore of the rear section of housing 693.

The solenoid is electrically connected by leads represented at 722 to a power supply unit 723 which is controlled by a photocell unit 724. Both the power supply unit 723 and its control arrangement, and the photocell unit are conventional devices well known to one skilled in the art. The photocell unit is suitably supported adjacent the position of bottles to permit actuation thereof by changes in light reflection by the index markings utilized on the bottles. Upon such actuation of the photocell unit by the sensing of an index marking on the bottle being rotated by spindle drive head 524 in the manner previously described, current is supplied by the power supply unit 723 to the solenoid coil 717 of such polarity as to create a magnetic field in the surrounding magnetic circuit which attracts the magnetic friction plate 706 into braking engagement with the face plate 719. The resultant braking force is transmitted through shaft 696 and attached gear 703 to retard driving gear 651 and disengage the clutch assembly to stop rotation of gear 651 in the manner described in conjunction with the mechanical sensing device. Upon the stopping of gear 651 the bottle will also stop in the indexed position since gear 651 ceases to rotate the spindle drive shaft 574. The spindle drive head 524 will then retract leaving the bottle fixed with respect to its supporting chuck 291 in an indexed position, after which it is disposed in a reference orientation in the manner described above.

OPERATION OF REGISTER UNIT

In describing the operation of the register unit directions of rotation of the various elements will be referenced to their direction of movement as viewed from the right hand side of FIG. 26.

The operating cycle of the register unit comprises both the upward and downward movement of lever arm 541 as effected by the configuration of upmoving cam 137 and down moving cam 138 through connecting rod 533. These cams are so configured as to cause a brief pause at both the top and bottom extremes of motion of lever arm 541 to permit sufficient time for the turret to step a new bottle in front of output head 521 at the bottom of the stroke and to permit sufficient time for the continuously rotating spindle head 524 to come to rest upon proper indexing of the bottle with respect to the detented chuck by the action of feeler 684 (FIG. 37) or the photoelectric unit 681 in FIG. 26.

After the brief pause in the movement of lever arm 541 at the bottom of its stroke, initial upward movement of the lever arm causes the distributing gear 529 to move clockwise through the direct drive of sector gear 527 and pinion 528. As gear 529 rotates, the gear 530, for advancing the spindle head 524, also rotates but in a counterclockwise direction. And the drive pin 609 fixed to gear 529 moves through the lost motion slot 611 in friction disc 612 in a clockwise direction as viewed in FIG. 25. During this period gears 531 and 532 remain at rest. Upon striking the right hand edge of the lost motion slot 611 the drive pin 609 drives gear 531 in a clockwise direction through frictional engagement of disc 612, thus causing gear 532 to rotate in a counterclockwise direction. During a relatively short but fixed degree of rotation of gears 531 and 532 the cam surface 622 and cam followers 619 cause the chuck drive head 522 to engage the outer drive head 326 of the bottle chuck 291 and rotate the chuck and bottle as a unit until the detent 331 is disengaged from the recess 334. Thereafter, depending upon the position of stop 643 (FIG. 27) finger 644 on gear 532 will either be in contact with the stop, thus locking both gears 532 and 531 or the gears will continue to rotate until the stop 643 is contacted by finger 644. This latter action depends upon the adjustment of the stop member 634 in accordance with the position of the index lug, recess or marking on the bottles. Upon contact of stop finger 644 with stop 643 gears 531 and 532 will cease to rotate. If this occurs before the pause caused by the configurations of cam 137 gears 529, 531 and the drive finger 609 on gear 529 will continue to rotate. During this period of rotation cam surface 598 and cam followers 594 will advance the continuously rotating spindle head 524 into contact with the spindle head 323 on the chuck 291. Upon this contact, the configuration of cam 137 will cause all gears 529–532 to remain at rest until the index configuration sensing finger 684 or the photoelectric unit 681 causes the spindle shaft 574 and spindle head 524 to come to rest because of the slippage of clutch plate 654. At the time of such stoppage the bottle will be positioned with its molding seams 691, FIG. 37, in an indexed position with respect to the outer chuck drive head 326. It is only necessary to return the chuck drive head 326 to its detented position by the return of drive head 522 to its initial position to place the bottle in a reference position in the bottle chuck 291. In such a position the bottle seams 691 are aligned with the reference plane 692 (FIG. 37) so that the bottle rotating spindles 835 in the two printing stations will by virtue of their 360° of rotation, always start and complete a printing operation in this position.

During the down stroke of lever arm 541 the spindle drive head 522 is retracted by the action of gears 529 and 531 and the camming action of cam surface 598 and cam followers 594. As this is being effected the drive pin 609 returns from the right side to the left side of the lost motion slot 611 whereby it is able once again to drive gear 531 and directly coupled gear 532, but in a reverse direction through the frictional engagement of disc 612 with gear 531. When gear 532 has been rotated sufficiently to permit the drive head 522 to be returned to its detented position and the camming surface 622 and cam followers 619 cause the head to disengage the chuck 291, the increase in pressure of spring 601 causes sufficient drag on gear 532 to make the friction disc slip with respect to gear 531, thus stopping motion of both gears 531 and 532. The disc 612 continues to slip until the finger 609 engages the left hand end of the clearance slot 610 on gear 536, at which time the direct engagement of finger 609 with gear 531 causes the cam follower 619 and gear 532 to retract the chuck drive head 522 and leave the chuck 291 in its detented position. Thereafter, the cam 138 presents a lull point to the followers 534 and 535 which causes the arm 541 to remain at rest while the turret steps the referenced bottle to the first printing station and presents the next bottle in front of the output head 521. At this point the cycle of operation described above is repeated.

It is to be noted that the annular stop member 634 may be adjusted by knob 648 to establish the correct degree of rotation of chuck 291 to accommodate differently located index lugs, recesses, or markings on bottles of different manufacturers. However, due to the orientation of stop surface 643, gear 632 will always be driven a sufficient amount to engage drive head 522 with the chuck head and to disengage the detent carried by the chuck head.

PRINTING PANTOGRAPH SYSTEMS

As shown generally in rear view in FIG. 2, the decorating apparatus 100 is equipped with two sets of dual pantograph linkages P and X associated, respectively, with the first and second printing stations of the turret G. Each set of pantograph linkages effects movement of first and second sets of printing frames for decorating the body and neck positions, respectively, in a manner to move them in printing contact over the bottles positioned by the turret in the printing station. Additionally, the linkages are associated with devices which serve to actuate means for rotating the bottles and for moving associated printing squeegees in coordination with the movements of the printing frames.

Figure 30:
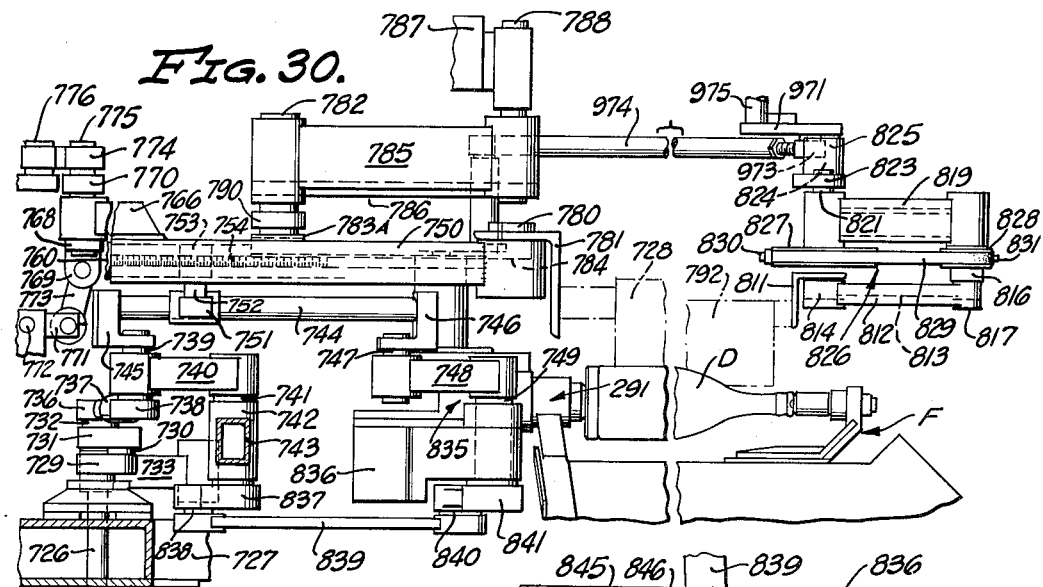
FIG. 30 is a side view of the driving linkages in FIG. 29 taken from the left side thereof.

FIGS. 29 and 30 show the first set P of pantograph linkages associated with the first printing station, corresponding to the fourth work station of the turret G; and will be the only set described since the second set X, associated with the second printing station is a symmetrically arranged duplication of the first set. Driving power is supplied to the linkage by the output shaft 726 of a conventional gear box 175 supported on frame member 727 and driven by the transmission system, as described in conjunction with FIG. 6.

(A) *Rear printing frame pantograph*

The linkage for moving the first printing frame 728 comprises a crank arm 729 attached at one end on the output shaft 726 which continuously rotates the arm in a counterclockwise direction as viewed in FIG. 29. The other end of the crank arm 729 is pivotally connected by a pivot pin 730 to the left end of a connecting rod 731, having fixed to its other end a pivot pin 732, including portions extending both above and below the rod. The lower portion of pin 732, pivotally receives the outer end of a crank arm 733 pivotally connected to a fixed pin 734 at its other end. The above connections of arms 729, 731 and 733 serve to oscillate the pin 732 along an arcuate path 735. An adjustable end 736 of a tubular connecting rod 737 is pivotally secured on the upwardly extending portion of the pin 732. The opposite adjustable end 738 on rod 737 is pivotally secured to the lower end of a pin 739 (FIG. 30) fixed on the end of a crank arm 740 which is fixed at its other end on the upper end of a pin 741, rotatably extending through a fixed journal 742 attached to the frame member 743 of the apparatus.

The remaining linkages for actuating printing frame 728 are driven from the upwardly extending portion of pin 739, and include a tubular rod 744 having depending L-brackets 745 and 746, fixed on the ends thereof. The lower flanges of the L-brackets are pivotally attached on the top portion of pin 739 and top portion of a pin 747 respectively. Pin 747 is pivotally secured on the end of a crank arm 748 related to crank arm 740, which is pivotally attached at its other end on a pin 749 journaled in a fixed housing to be described in conjunction with FIGS. 31 and 32.

The above-described linkages operate to cause rod 744 to be driven in an oscillatory motion between the ends of oscillating crank arms 740 and 748. This motion is adjustably imparted to a hollow master control arm 750 by a sleeve 751 slidably disposed on rod 744. The sleeve 751 is pivotally attached by an upstanding pin 752 mounted on the side of the sleeve to a nut member 753 threadably received on a threaded rod 754 longitudinally disposed inside the hollow master control arm 750.

Figure 30A:
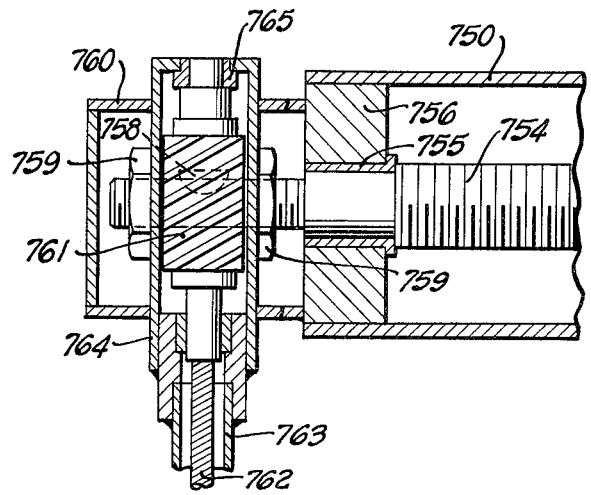
FIG. 30A is a cross-sectional view of the details of the master control arm included in FIG. 30.
Figure 30B:
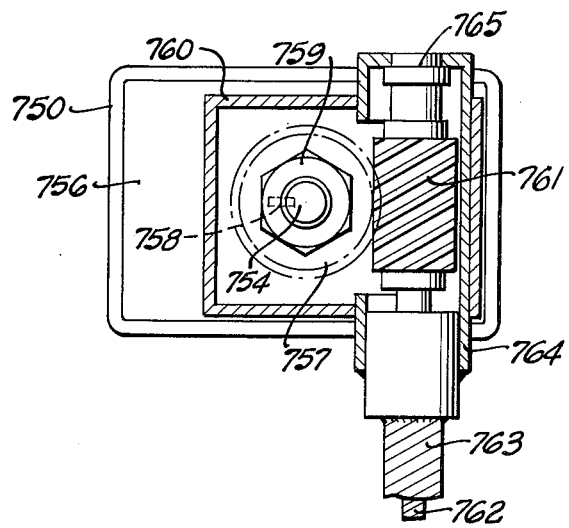
FIG. 30B is an end view of the control arm shown in FIG. 30A.

As shown in FIGS. 30A and 30B, the threaded rod 754 is rotatably mounted in bushings 755 disposed in fixed end closures 756 at the ends of the control arm. At the left end of the control arm there is provided an adjusting means by which the rod 754 may be rotated to adjust the position of nut member 753 on the rod to vary the length of stroke of the printing frame as required by the various size bottles or decorations being applied thereto.

This adjustment mechanism comprises a helical gear 757 fixed by a key 758 and nut and washer assemblies 759 to a protruding end of rod 754 disposed in a housing 760 attached to the left end of the control arm as viewed in FIG. 30. In order to adjust the position of nut member 753, and hence, the position of sleeve 751 on rod 744, gear 757 may be rotated by a cooperating helical gear 761 fixedly disposed on a flexible shaft 762 which is contained in a flexible housing 763 and terminated in a tubular housing 764 secured to the side of the housing 760 and communicating with gear 757. As may be seen in FIGS. 30A and 30B one end of the flexible shaft is rotatably received in a sleeve bearing 765 at its other end, the flexible shaft is adjustably rotated by means of a control knob or crank, not shown, which is suitably disposed on the apparatus. This adjustment is utilized to control the length of stroke of the front end of the control arm 750. When the nut 753 is adjusted to the left on the rod 754 as seen in FIG. 30, the movement of the front end of the arm 750 is increased, and decreased when the nut 753 is adjusted to the right on the rod 754.

The rear end of the control arm is supported in a manner whereby it may be universally pivoted in a fixed plane. The system for providing this support comprises an arm 766 extending rearwardly of the control arm that is provided with a fixed upstanding pin 767 which pivotally supports both a bracket 768 having a depending arm 769, and one end of a crank arm 770. The depending arm 769 is pivotally secured to a crank arm 771 supported on a fixed pivot pin 772 by means of a connecting arm 773 pivotally secured at its ends to both the arm 769 of the bracket 768 and an upstanding end of the crank arm 771. The crank arm 770 is pivotally atached at its outer end to the outer end of a crank arm 774 by a pin 775, and the other end of the crank arm 774 is pivotally secured to a pin 776 attached to the frame of the apparatus.

At its front end, control arm 750 is pivotally connected by a pin connection 780 on a mounting bracket 781 which suitably supports the printing frame 728 so that it will be positioned over the body portion of the bottle D positioned at the first printing station by the turret. The forward end of the arm 750 along with the attached bracket 781 and printing frame 728 are constrained to move in a straight path perpendicular to the axis of the bottle by a mechanical linkage comprising two sets of parallel arms associated with a central pivot pin 782 secured to the top of the control arm by a base member 783A. This linkage is formed by a first set of arms pivotally connected to the ends of the mounting bracket comprising a first arm formed by the length of the control arm 750 between the central pivot pin 782 and the connecting pin 780 and a second arm 783 pivotally attached to the bracket by a pin connection 784. The other set of arms comprises the upper arms 785 and 786 which are pivotally secured onto the frame 787 of the apparatus by pivot pins 788 and 789, respectively. The rear end of the arm 785 is pivotally attached to the central pin 782 and is maintained parallel to the arm 786 by means of a linking arm 790 having one end pivotally secured on the pin 782 between control arm 750 and the arm 785, and its other end interposed between the rear ends of the arms 783 and 786 and pivotally attached thereto by a pin 791. Since the spacing between the pairs of pivot points 782, 791 and 780, 784 is equal and arms 785 and 786 are equal in length, and connected to the frame of the apparatus with the same spacing, the movement of the mounting bracket 781 and attached printing frame 728 is always along a straight line perpendicular to the axis of the bottle.

(B) *Forward printing frame pantograph*

The second printing frame 792 is caused to move back and forth along a path parallel to that of the printing frame 728 and in synchronism therewith by a second linkage system disposed forwardly of the system for moving printing frame 728. This system includes an adjustment linkage 793 formed by two parallel arms 794 and 795 which overlie two parallel arms 796 and 797. The arms 794 and 795 are connected on arms 796, 797. The arms 794 and 795 are connected on arm 797 by fixed pivot pins 798 and 799, and to the arm 796 by a pair of pivotal conections 800 and 801. The pivotal conenctions 800 and 801 also permit adjustment of arm 796 lengthwise along arms 794 and 795. This linkage pivotally is connected at the end of the arm 795 by a pivot 802 onto an angled driving member 803 secured to the mounting bracket 781 for printing screen 728, and is pivotally secured on another angled arm 804, fixed to the frame of the apparatus at 805, by a pivot pin 806 at the end of the arm 797. The adjustment linkage 793 further includes an adjustable connecting arm 807 which is attached onto arm 796 by an adjustable pivot connection 808 permitting longitudinal adjustment of arm 796 therein. Connecting arm 807 is provided at its midportion with a suitable telescoping coupling 809 to permit lengthwise adjustment of the arm to adjust the position of printing frame 792. The opposite end of the connecting arm 807 pivotally connects by a pin 810 onto the top flange of a bracket 811 which suitably supports the printing frame 792.

The stroke of mounting bracket 811 and printing frame 792 may be adjusted to have a greater length of travel with respect to printing frame 728 carried on bracket 781 by adjustment of pivots 800 and 801 so as to move arm 796 in parallel relation toward pivot 802. Also, pivot 808 is adjusted along arm 796 to a point to maintain pivot points 802, 806 and 808 in a straight line. To decrease the stroke of printing frame 792 with respect to printing frame 728, pivots 800 and 801 are adjusted to move arm 796 away from pivot 802. Also pivot 808 is readjusted to maintain pivots 802, 806 and 808 in a straight line.

Mounting bracket 811 is provided with a pair of arms 812 and 813 pivotally secured thereon by pivot connections 814 and 815, which are joined at their outer ends by a connecting arm 816 on upstanding pivot pins 817 and 818 in a manner to provide equal spacing between the pairs of pivots 814, 815 and 817, 818. A pair of arms 819 and 820 have one of their ends pivoted on the upstanding pivot pins 817 and 818 and the other ends pivotally connected by pins 821 and 822 to a bracket 823 that is fixed by a central post 824 to a member 825 which is fixed to the frame of the apparatus. In order to maintain the mounting bracket 811 in a straight line of movement arms 812, 813, 816, 819 and 820 are prevented from straying from a fixed path of movement by a stabilizing device 826. This device comprises a large diameter split pulley 827 fixed to pivot pin 821 and a smaller pulley 828 fixed to the pivot pin 817. A steel band 829 passing around the pulley 828 is fixed by bolts 830 to the rear side of the pulley 827 and by a pin 831 to the pulley 828.

(C) Operation of pantograph system

The linkage systems described above operate to control the movement of the printing frames 728 and 792 in coordination with the movement of the stepping turret in the following manner. When a bottle is stepped in the printing station the printing frames 728 and 792 will be disposed at either extreme of their path of movement. As shown in FIG. 29, they are positioned very close to the left hand extreme where the printing frames are on the left side of the bottle D. As the driving crank arm 729 rotates to a position to dispose the crank arm 733 in the dashed line position 832 the printing frames will be moved over the bottle, during which time they will impress decorations on the bottle, and the printing frames will arrive at the right hand extreme point of their movement. At this extreme point the printing frames will be disposed on the right side of the bottle. Before the linkage systems move the frames to the left extreme again, the turret G will operate to step the decorated bottle from the first to the second printing station and will dispose an undecorated bottle in its place, at the first printing station. The linkage systems will operate to return the printing frames again to the left and during the return movement apply decorations to the new bottle. In this manner a new bottle is decorated on each stroke of the printing frames. This same mode of operation applies at the second printing station where the motion of the pantograph system Q, shown in FIG. 2, moves in coordination with the system P described above. Thus it is apparent that on one direction of the stroke of the printing frames, system P at the first station may apply a decoration of a first color or texture to the bottle disposed therein, while simultaneously the system Q at the second printing station is applying a second decoration of a different color or texture to a bottle that was decorated on the previous stroke at the first printing station. It should also be pointed out that both sets of printing frames P and Q are moving in the same direction and their paths cross because of the intersecting angles of their paths of travel, as may be seen in FIG. 2. To avoid interference between the two sets P and Q their movements are so timed to permit sufficient clearance at the midpoints of their travel.

Figure 32:
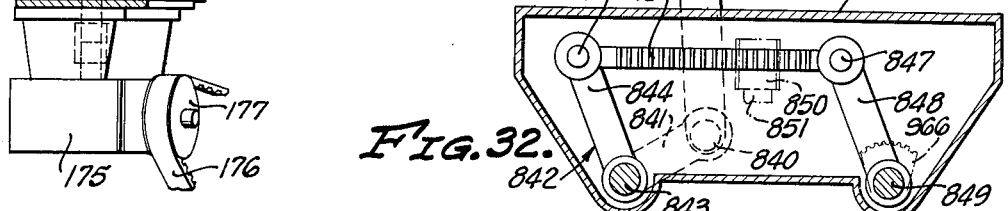
FIG. 32 is a view of the rack driving arrangement for operating the assembly in FIG. 31.
Figure 31:
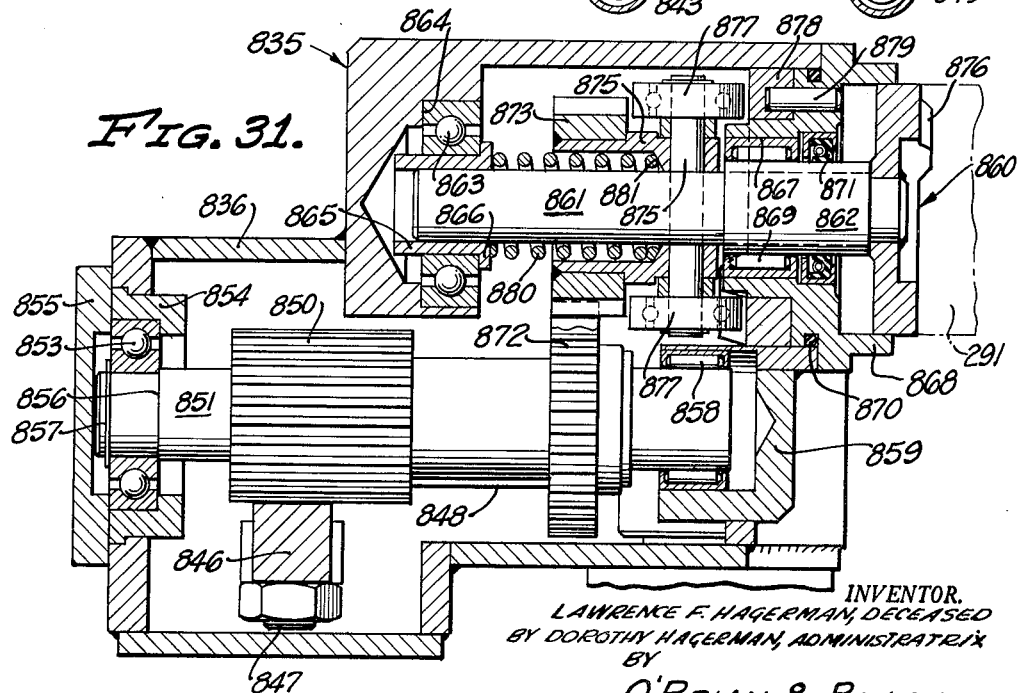
FIG. 31 is a cross-sectional view of printing drive spindle for rotating the bottles during the printing operations.

In order to effect proper printing by the printing frame, the systems P and Q perform the additional operations of rotating the bottles disposed at the stations by means of the device shown in FIGS 31 and 32 and operating a printing squeegee device to be described in conjunction with FIGS. 33–36.

PRINTING DRIVE SPINDLE

Rotation of the bottles is accomplished by means of a printing drive spindle 835 shown in its relation to the printing frame drive linkage in FIGS. 29 and 30, and in detail in FIGS. 31 and 32. As viewed in FIG. 29, the drive spindle 835 is disposed in a drive housing 836 in confronting relation to a bottle chuck 291 on the bottle holding clamp F.

The spindles 835 are powered by the pantograph systems P and Q in coordination with the movement of the printing frames 728 and 792. The driving power is derived from a crank arm 837 which is fixed at one end on the portion of the pivot pin 741 extending below fixed journal 742. The other end of the crank arm 837 is pivotally secured by a pivot connection 838 to an arm 839 that is pivotally connected at the pin 840 to the arm 841 of a bell crank 842 pivoted within housing 836 on a shaft 843. As viewed in FIG. 32, the opposite arm 844 of the bell crank 842 is pivotally attached by a pin 845 to one side of a flat gear rack 846. The other end of the gear rack 846 is connected by a similar pin 847 to a crank arm 848 which is fixed to a pivotal shaft 849 extending through the top of the housing 836. Since the gear rack 846 moves in response to the movement of the crank arm 837, which follows the movement of the crank arm 740 through the mutually attached pin, the gear rack and printing frames always move in the same direction.

As shown in FIG. 32, the rack 846 is disposed in driving engagement with a rack follower gear 850 fixed to the drive shaft 851 of the bottle drive spindle 835. The drive shaft 851 is rotatably disposed in the housing 836 at its rear end by a ball bearing assembly 853 which is secured in a retainer 854 by a cover plate 855 and maintained against a shoulder 856 on the shaft by a snap ring 857. The front end of the shaft 851 is received in a roller bearing assembly 858 disposed in a journal 859 attached to the housing.

In the top part of the housing 836 the driving head 860, which engages the chuck 291 to rotate the bottle D, is attached to the forward end of a shaft 861 by means of a rearwardly extending sleeve 862. The shaft 861 is rotatably secured in the housing by a rear ball bearing assembly 863 interposed between a housing seat 864 and a sleeve bearing 865 having a forward flange 866 which is disposed on the shaft. The front end of the shaft 861 is rotatively disposed in the bore 867 of a cylindrical retainer member 868 by means of a roller bearing 869 disposed between the sleeve 862 of the drive head and the bore 867 of the retainer member. Oil seals 870 and 871 are provided between the outer surfaces of the retainer member 868 and the housing and between the inner bore of the retainer 868 and the sleeve 862 of the driving head. Rotation is imparted to the driving head 860 by means of a gear 872 on drive shaft 851 which is in engagement with a gear 873 disposed on a cylindrical member 874 that is secured to the shaft by an axial shaft 875 which extends through both the cylindrical member 874 and shaft 861. In order to reciprocate the driving head with respect to the housing to enable the drive lugs 876 to engage and disengage the recesses 327 in the bottle chuck, roller cam followers 877 are disposed on the ends of the axial shaft 875 which engage an annular cam 878. The cam is carried by cylindrical member 868 and secured thereto by a pin 879. The cam followers are maintained in contact with the cam 878 by means of a compression spring 880, coaxially disposed on a shaft 861 between the flange 866 on the bearing 865 and a recessed seat 881 in the cylindrical member 874.

The selection of gear ratios, between the gear rack 846, interpose gears 850 and 872 on the drive shaft 851, and the gear 873, which drives the driving head 860 is such as to cause the drive head to rotate 360° with each direction of the stroke of the gear rack. With this arrangement the bottles are turned one revolution in one direction in the same direction in each printing station back to their reference position in the holding clamps F on one direction of movement of the printing frames and one revolution in the opposite direction during their movement in the other direction. Thus the direction of rotation and extent of rotation of the bottles are always coordinated with the movements of the printing frames since they also move in the same direction on the same stroke in the two printing stations.

SQUEEGEE DEVICE

The preferred embodiment of the decorating apparatus, shown in the drawings, utilizes the well-known silk screen process for printing the decorations on the bottles. This process requires the use of impervious silk screen stencils having the desired decorations defined by permeable areas through which a supply of printing ink or paint is worked by squeegee blades. The screen is moved with respect to the blades to form the decorations on a bottle contacting the other side of the screens. Since the apparatus may be adjusted to accommodate a variety of container sizes and shapes, squeegee mounting devices are provided which may be adjusted to meet the particular needs presented by the different containers.

Referring to FIGS. 32–36, the squeegee mounting devices are supported on a rear plate member 885 secured to the frame of the decorating apparatus by means of bolts 886 extending through forwardly projecting brackets 887. The rear plate 885 has forwardly extending journals 888 and 889, suitably secured thereto, as by weldments, at the front end of which L-brackets 890 and 891 are pivotally secured by bolts 892 and 893. The upstanding legs of brackets 890 and 891 are pivotally connected by an arm 894 secured by pins 895 and 896, and the horizontally extending legs have angled support brackets 897 and 898 attached thereto by bolts 899 and 900. Bolt 899 also secures a rearwardly extending journal 901 (see FIG. 35) to L-bracket 890 which rotatively supports a roller cam follower 902. Two horizontally extending shafts 903 and 904 are secured between the forwardly extending arms 905 and 906 of support brackets 897 and 898 by bolts 907. The shafts 903 and 904 support two squeegee mounting fixtures 908 and 909, each comprising sleeves 910 and 911 slidably received on the shafts 903 and 904 and are connected by central webs 912. The front sleeve of each support fixture is provided with adjustment means comprising a cylindrical body 913 having an internal gear 914 communicating through the sleeve into engagement with an elongated gear rack 915 disposed on the front edge of shaft 904. Each gear 914 is disposed on a shaft 916 pivotally secured in the cylindrical body 913 and having a mounting head 917 to which an operating handle 918 is secured. Each mounting fixture is provided with a lock member 919 comprising an elongated hollow tube 920 having a shaft 921 rotatably secured therein which includes wedging cams 922 that may be turned into locking engagement with shafts 903 and 904 by an operating handle 923. The forward sleeves 911 of mounting fixtures 908 and 909 are provided with depending shafts 924 equipped with elongated gear racks 925 disposed along their front surface.

A squeegee assembly 926 which cooperates with the printing frame 728 for decorating the body portion of the bottles is supported on the depending shaft 924 on the mounting fixture 908, and an assembly 927 related to the printing frame 792, for decorating the neck portion of the bottles, is similarly disposed on the shaft 924 on fixture 909. Since the two assemblies are identically constructed, differing only in the size of the squeegee blade, only assembly 926 will be described in detail. This assembly comprises a vertically extending sleeve 928 which is received on the shaft 924 and includes an adjustment means comprising operating handle 929 which is identical to the adjustment described in conjunction with sleeve 911 disposed on the horizontal shaft 904. The lock for the sleeve 928 comprises a threaded member 930 extending through the sleeve which may be turned by an operating handle 931 to lock the sleeve to the shaft 924. The squeegee blade 932 formed of rubber or other suitable material, is secured in a holder 933 attached in a mounting block 934 of an adjustment assembly 935. The adjustment assembly is supported on the sleeve 928 by a suitably attached arcuate member 936 pivotally attached at its lower end to a support arm 937 by means of a bolt 938. The bolt 938 also secures an adjustable member 939 having a support pin 940 upon which support member 937 rests. The end of the support arm is secured by welding to the cylindrical housing member 941 of the adjustment assembly 935. This arrangement enables the squeegee blade to pivot up and down on the support arm 937 in response to eccentricities in the shape of the printing frame or bottle being decorated. The lower limit of the swing of support arm may be fixed by pivotal adjustment of the member 939 to suitably position the support pin 940 beneath the arm 937.

The squeegee blade is made to bear against the rear side of the silk screen 942 by an adjustable compression member supported on a rearwardly projecting post 943 attached to the support sleeve 928, and an upstanding lug 944 attached to the top of the cylindrical housing member 941. The compression member comprises an eye bolt 945 having its eye portion rotatably positioned on a lug 946 on the post 943, and its threaded shank adjustably extending through a cap member 947 of a downwardly extending sleeve 948. The sleeve 948 is telescopically disposed over a hollow portion of a member 949, pivotally attached at its base by means of a bolt 950 which pivotally extends through the lug 944. The squeegee is urged toward the silk screen 942 by a coaxially disposed compression spring 951 bearing between the inside base of the cap member 947 and a shoulder 952 within the hollow portion of the member 949. The pressure of the squeegee blade against the silk screen may be suitably adjusted by rotation of the cap member 947.

Adjustment assembly 935 provides means whereby the position of the squeegee blade may be changed along the path of movement of the printing frame 732 to permit centering of the blade over the center line of the bottle to afford optimum printing results. This assembly also permits angular adjustment of the blade so it may conform to angular surfaces of the bottle. The assembly as seen in FIG. 36 comprises an adjustment knob 953 having an annular skirt 954 threadedly engaging the interior wall of the cylindrical member 941. The interior bore 955 of the skirt 954 terminates with a conical seat which interengages with a similar seat on the end of a cylindrical member 956 slidably but non-rotatively disposed in cylindrical housing member 941 by means of a key 957 fixed to the member 941 which is disposed in a longitudinal slot 958. A compression spring 959 is received in the interior bore 955 of the skirt 954 which bears against the base thereof, and the abutting end of the member 956 to provide a separating force between the conical seats on members 954 and 956. The mounting block 934 for the squeegee blade 932 is held tightly against the outer end of the slidable member 956 by threaded connection to the end of a bolt 960, rotatively extending through the member 956 and adjustment knob 953, and having its head keyed in a recess 961 of a second locking knob 962. An interposed ball bearing assembly 963 on the bolt 960 is positioned between knobs 953 and 962 to enable the knobs to be relatively rotated. As may be seen from the above structural arrangement, the squeegee blade carried on mounting block 934 may be adjusted along the path of the movement of the printing frame into position over the center line of the bottle by rotating knob 953 to permit longitudinal movement of the member 956 within the cylindrical member 941. The block 934 may be adjusted to a desired angular position by rotation of the knob 962 to free the block from the member 956, whereupon it may be turned by hand to the desired position and secured therein by turning the knob 962 to tighten it against the end of the member 956.

The squeegee mounting device further includes a cam 964 operable to raise the blade out of contact with the rear face of the silk screen 942 thereby enabling the printing ink or paint to flow beneath and to the other side of the blade to assure that a sufficient supply will be moved back over the permeable decoration areas of the screen upon the reverse movement of the screen to make a satisfactory printing impression.

The squeegee blades carried by mounting fixtures 908 and 909 are raised and lowered in the following manner. As cam 964 moves in an oscillatory manner, the protuberances 965 thereon, cause the cam follower 902 to rise and fall at the end of each stroke of the printing frames beneath the squeegee blades. The mounting fixtures 908 and 909 carrying the blades are caused to follow the motion of the cam follower by their connection to the cam follower by horiozntal shafts 903 and 904 and the end mounting brackets 897 and 898. The lifting action of the cam follower is uniformly transferred to each end mounting bracket by the direct connection on brackets 897 and the following movement of the end bracket 898 through pivoted L-brackets 890 and 891, and the interconnecting arm 894.

Cam 964 is rotated in coordination with the movement of the printing frames by the linkage connections shown in FIGS. 29, 32 and 33. As viewed in FIGS. 29 and 32, the top end of the upstanding shaft 849 supports a sector gear 966 engaged in driving relation with another sector gear 967 supported on a shaft 968 pivotally attached to a housing 969 attached to the printing drive spindle housing 836. The shaft 968 fixedly supports a crank arm 970 whose outer end is interconnected with the outer end of another crank arm 971 by pivot pin connections 972 and 973 at the ends of an adjustable connecting rod 974. The crank arm 971 is rotatively supported on a pivot pin 975 fixed to the frame of the decorating apparatus. A connecting rod 976, also pivoted on the end of the crank arm 971, is pivotally connected at 977 to the outer end of a crank arm 978 fixed to the shaft 979, pivotally supported in a gear box 980. The oscillatory motion imparted to the shaft 979 by the above linkage, is utilized to oscillate the cam 964 through a sector gear 981 fixed to the shaft 979 and in driving relation with a gear 982 attached to the shaft 983 supporting the cam 964.

OPERATION OF DECORATING APPARATUS

The operation of the decorating apparatus will be described in terms of a pilot bottle as it first enters the loading turntable 109, FIG. 5, until it has been dis-engaged by the bottle accelerator device 347, FIG. 12, on the unloading conveyor C.

The pilot bottle will be transferred from the supply turntable 109 into position on the loading loading conveyor B, by the action of feed gate 111, in FIG. 5, and the star wheel assembly 107 also shown in FIG. 5. Upon arrival at point X on the conveyor B the transfer unit E will be pivoted to its extreme clockwise position and the finger actuating mechanism thereof will close the fingers 450 and 451, in FIG. 19, of the bottle gripping assembly T to grasp the bottle. The bottle will then be carried by the assembly T as the transfer unit pivots to its extreme counterclockwise position and raised slightly by the action of the lifting cam 491 in FIG. 12 of the transfer unit to be positioned between the base seat and nose cone of the bottle clamp F, which have been opened by the action of the cam 139 shown in FIG. 6. As the cam follower 285 shown in FIG. 10 moves downwardly to lower the nose cone 242, after the transfer unit has lowered the bottle into chuck 291 shown in FIG. 7, into the gripping relation with the bottle the fingers of the assembly T will open to release the bottle and be swung back to the clockwise position by the transfer unit. The turret then steps the attached holding clamp and bottle to the second station where it will pause in accordance with the stepping operation of the turret, by the Geneva gear assembly 225 shown in FIG. 7. The next stepping movement of the turret will position the bottle at the third station confronting the register unit K. In this position, as previously described, the bottle holding chuck at the base of the holding clamp F is rotated a prescribed degree and the bottle is rotated until stopped in an indexed position by the feeler mechanism shown in FIG. 37 or the photoelectric unit 681, shown in FIG. 26. The chuck 291 is then returned to its detented position disposing the bottle in the holding clamp F with its molding seams in a reference position where they will not interfere with subsequent printing operations.

The bottle is then stepped in the usual manner by the turret to the fourth station corresponding to the first printing station. At this station the bottle holding chuck 291 will be disposed in confronting relation with the printing driving spindle 835, shown in FIG. 31, and, as described in conjunction with the pantograph systems P and Q and the operation of the spindle 835, the bottle will be rotated in the direction of movement of the printing frames, and the squeegee blades will be momentarily raised and lowered in the printing frame. When the printing frames have completed their stroke the bottle will have been rotated a full 360° back to its reference position at which time the turret will step the bottle to the fifth station or second printing station where a second decoration is applied to the bottle by the same operations of the first printing station, only with the printing frames and the bottle moving in the reverse direction.

The bottle is then stepped by the turret through the idle sixth and seventh stations and back to the first station. Upon arriving at the first station again, the transfer unit E will be positioned in its extreme clockwise position with the open fingers of the bottle gripping finger assemblies U starting to close to grasp the then fully decorated bottle in the holding clamp F. Cams 139 (FIG. 1), and 285 (FIG. 10) are actuated to release the nose cone and slightly elevate the bottle held by the finger assemblies U. The transfer unit then pivots to its extreme counterclockwise position where the bottle is disposed over the unloading conveyor C at which time the assemblies U open to release the bottle and the bottle accelerating fingers 505 (FIG. 12) swing quickly to the left to push the bottle along the conveyor out of range of the transfer unit to permit it to return again to its extreme clockwise position.

The operation of the decorating has been described in terms of a single bottle and the sequence of operations performed by the apparatus as the bottle progressed through a complete cycle. However, it is to be understood that when the turret is completely loaded with bottles the above operations are performed simultaneously at each of the stations and the processing of bottles through the apparatus is continuous.

It is to be understood that the disclosure of the invention herein is exemplary of a preferred form and the apparatus is not limited to the decorating of bottles or round containers. Variations may be made in the specific forms and configurations of the parts used and the specific materials referred to without departing from the spirit and scope of the invention. The disclosure herein is to be interpreted in illustrative rather than a limiting sense and the invention is to be accorded the full scope of the claims appended hereto.

What is claimed is:

1. A decorating apparatus including: a rotary turret, means for moving said turret intermittently through a loading station and a succession of work stations, a plurality of article holding means on said turret sequentially movable adjacent said stations;
   transfer means disposed adjacent said loading station for simultaneously receiving undecorated articles from a first source and for receiving decorated articles from said article holder on said turret then adjacent said loading station;
   said decorating apparatus being disposed in a substantially horizontal plane, said turret having an axis, and having a plurality of article holders arranged about said turret axis, each of said article holders having an article holder axis, said article holder axes intersecting with said turret axis at a point, each of said article holder axes intersecting said vertical axis at an equal angle so that each of said article holder axes defines a plane together with the turret axis, each of said planes being disposed at equal angles with respect to each other, said angles being arranged so that said article holders are moved with said turret intermittently through said succession of work stations so that at the same time at said loading station said article holder axis is perpendicular to the plane of the decorating apparatus and at least at one of said work stations said axis of said article lies parallel to said plane of said decorating apparatus.

2. A decorating apparatus as defined in claim 1 including:
   a detenting device on each of said article holders to maintain said articles in said reference position as they are presented to said plurality of said work stations by said turret.

3. A decorating apparatus as defined in claim 1 including:
   decorating means for applying decorations on said undecorated articles disposed at said work station whereas said article holder lies in a plane parallel to said plane of said decorating apparatus; and
   means positioned adjacent a different one of said work stations for orienting said undecorated articles in a reference position in said holding means whereby said decorating means applies decorations on a specific area of said articles.

4. A decorating apparatus as defined in claim 3 wherein said angles of said turret axes and planes are such that when one of said article holders has its axis perpendicular to said plane of said decorating apparatus, two of said article holders have their axes parallel to said plane of said decorating apparatus;
   a decorating device disposed adjacent each of said article holders wherein said article holder axes are parallel to said plane of said decorating apparatus so that a plurality of decorations can be applied on undecorated articles when the undecorated articles are disposed in a plane parallel to said plane of said decorating apparatus.

5. A decorating apparatus including:
   a turret provided with a plurality of spaced rotary article holding means, means for rotatably stepping said turret through a plurality of positions during each rotation of said turret;
   a transfer device positioned adjacent one of said positions adapted for simultaneously engaging undecorated articles having index means thereon from a first area and decorated articles from said holding means on said turret, and for transporting the articles from said first area to said holding means in said one position and for transporting decorated articles from said holding means to a second area;
   a decorating device disposed adjacent a different one of said positions, said decorating device comprising means adapted for applying a plurality of different decorations on the articles when the articles are disposed adjacent said different ones of said positions by said stepping means;
   an article registered device disposed adjacent still a different one of said positions, said article registered device comprising means adapted for rotating undecorated articles disposed in said article holding means relative to said holding means, and a device for sensing indexing means on the undecorated articles to stop rotation of the undecorated articles relative to said holding means in an indexed position whereby said decorating device is adapted to apply a plurality of different decorations on specific areas of the undecorated articles;
   said article register device comprising a roller lock adapted to cause rotation of the undecorated articles to a register position independent of the positioning caused by said decorating device.

6. A decorating apparatus as defined in claim 5 wherein:
   a plurality of decorating devices are disposed adjacent different ones of a plurality of different positions of said turret, each of said decorating devices being provided with means for applying different colored and shaped decorations on said articles when said turret disposed said article in said holding means adjacent said different positions.

7. An article supporting device including:
   a fixed article support member, a longitudinally slidable clamping member disposed on said support member, a biasing spring bearing between said members biasing said clamping member in said longitudinal direction, a base member fixed to said support member comprising a rotatable article support seat positioned with respect to said clamping member so as to firmly support an article therebetween in clamping relation under the bias force applied by said support member;
   said base member further including a first longitudinally movable rotatably disposed drive head directly coupled with said said support seat, and a second rotatably disposed drive head coaxial with said first drive head and drivingly coupled thereto by a separable surface maintained in driving relation therewith upon longitudinal movement of said first member by said bias force whereby said second drive head may be engaged by a rotating drive member to rotate an article disposed between said rotatable clamping member and said seat and said first drive head may be engaged by a rotating drive member applying an opposing force adjacent said bias force to disengage said first member from said second member to rotate an article clamped between said clamping member and said seat independent of said second drive head.

8. An article register assembly for positioning articles provided with index points seated in holding chucks carried on and successively positioned adjacent the register assembly by an article processing apparatus wherein, each holding chuck includes a first drive head separably coupled to the chuck for rotating the articles independently of the chuck and second drive means on the chuck for rotating the chuck from a detent position together with the articles, said register assembly comprising a positioning drive member, a rotating drive member, first means for engaging said positioning member with a detent positioned chuck adjacent said assembly to rotatively position the chuck in a reference position relative to the detent position and reposition the chuck in the detent position, second means for sensing the index points when the bottles are rotated, second means responsive to said sensing means for engaging said rotating member with the first drive head to decouple the head and rotate the article independently of the chuck and in response to said sensing means disengage said rotating member from the first drive head before said positioning member repositions the chuck to the detent position, whereby said positioning and rotating members effect the location of the articles in a reference position relative to the detent position of the chuck.

9. An article register assembly as defined in claim 8 including adjustment means for regulating the degree of rotative positioning effected by said positioning member.

10. A linkage device for moving a mounting member in a linear direction including:
   a drive linkage comprising a rotary drive first crank arm pivotally attached to a first position on a first connecting rod, an arm having one end fixed pivotally and the other end pivotally attached to a second point on said first connecting rod, whereby rotation of said first arm moves said second point in an oscillatory path;
   a second connecting rod pivotally attached at one end to said second point and the other end thereof pivotally attached to the end of a first fixed crank arm, a third connecting rod pivotally joined at its ends to the end of said first fixed crank arm and to the end of a second fixed crank arm;
   a control lever having its first end connected to means providing universal movement in a plane, means attaching a point on said control arm in sliding with said third rod;
   an assembly for constraining the movement the second end of said control lever along a straight line comprising a length of said control lever extending a first distance between a first pivot connection thereon and a pivotal connection between the second end of the control lever and a first pivot point on a mounting member, a second lever disposed in parallel with said length pivotally connected at its first end to a second pivot point on said mounting member disposed a second distance from the first pivot point thereon, a pivot second connection on said second lever disposed on said first distance from its connection to said mounting member being pivotally connected by pivotal connections on a connecting link with the first pivot connection on said control, a pair of parallel levers having one of their ends pivotally secured on fixed pivots spaced from said second distance and the other end of one of said pair pivotally secured to the first pivot on said control lever and the other end of the other of said pair pivotally attached to the second pivot connection on said second lever.

References Cited by the Examiner
UNITED STATES PATENTS

| | | | |
|---|---|---|---|
| 2,195,625 | 4/1940 | Knaggs | 101—38 |
| 2,202,762 | 5/1940 | Freed | 101—44 |
| 2,278,570 | 4/1942 | Shurley | 101—115 |
| 2,484,671 | 10/1949 | Bauman | 101—124 |
| 2,730,068 | 1/1956 | Reynolds et al. | 118—49 |
| 2,739,531 | 3/1956 | Hagerman | 101—126 |
| 2,822,911 | 2/1958 | Kummer et al. | 198—25 |
| 2,972,943 | 2/1961 | Velonis | 101—124 |

WILLIAM B. PENN, *Primary Examiner.*

ROBERT A. LEIGHEY, *Examiner.*